US012705920B2

(12) United States Patent
Huang et al.

(10) Patent No.: US 12,705,920 B2
(45) Date of Patent: Aug. 11, 2026

(54) METHOD AND APPARATUS FOR GENERATING FINGERPRINT IMAGE TO BE RECOGNIZED

(71) Applicant: HUIKE (SINGAPORE) HOLDING PTE. LTD., Singapore (SG)

(72) Inventors: Liguang Huang, Shenzhen City (CN); Miantao Hu, Shenzhen City (CN); Jingdan Min, Shenzhen City (CN)

(73) Assignee: HUIKE (SINGAPORE) HOLDING PTE. LTD., Singapore (SG)

( * ) Notice: Subject to any disclaimer, the term of this patent is extended or adjusted under 35 U.S.C. 154(b) by 0 days.

(21) Appl. No.: 19/003,640

(22) Filed: Dec. 27, 2024

(65) Prior Publication Data

US 2025/0259474 A1 Aug. 14, 2025

Related U.S. Application Data

(63) Continuation of application No. PCT/IB2024/059122, filed on Sep. 20, 2024.

(30) Foreign Application Priority Data

Feb. 8, 2024 (CN) ......................... 202410177930.8

(51) Int. Cl.
*G06V 40/13* (2022.01)
*G06F 16/53* (2019.01)
(Continued)

(52) U.S. Cl.
CPC .......... *G06V 40/1306* (2022.01); *G06F 16/53* (2019.01); *G06V 10/28* (2022.01);
(Continued)

(58) Field of Classification Search
CPC .... G06V 40/1306; G06V 10/28; G06V 10/75; G06V 10/761; G06V 40/1365; G06F 16/53
See application file for complete search history.

(56) References Cited

U.S. PATENT DOCUMENTS 11,182,586 B2 11/2021 Li et al.
2018/0373393 A1 12/2018 Lerner et al.
(Continued)

FOREIGN PATENT DOCUMENTS

CN 106203365 B 2/2019
CN 108064386 B 4/2022
(Continued)

OTHER PUBLICATIONS

International Search Report and Written Opinion issued in PCT/IB2024/059122; mailed Nov. 18, 2024; 19 pgs.

*Primary Examiner* — Premal R Patel
(74) *Attorney, Agent, or Firm* — Zhong Law, LLC

(57) ABSTRACT

The embodiments of the present disclosure provide a method and apparatus for generating a fingerprint image to be recognized, and relates to the technical field of ultrasonic fingerprint recognition. A specific embodiment of the method includes the following steps: collecting a fingerprint image of a fingerprint; using a first feature of the fingerprint image to match a target background image for the fingerprint image from a background image library, where the first feature of the fingerprint image is at least one of a signal flight time of an ultrasonic signal for generation of the fingerprint image, a signal transmission frequency of the ultrasonic signal for generation of the fingerprint image, or a collection time of the fingerprint image; and subtracting the target background image from the fingerprint image to obtain a fingerprint image to be recognized of the finger-
(Continued)

print. The embodiment can improve the fingerprint recognition accuracy in various recognition scenarios.

16 Claims, 10 Drawing Sheets

(51) Int. Cl.

| | |
|---|---|
| ***G06V 10/28*** | (2022.01) |
| ***G06V 10/74*** | (2022.01) |
| ***G06V 10/75*** | (2022.01) |
| ***G06V 40/12*** | (2022.01) |

(52) U.S. Cl.
CPC ............ *G06V 10/75* (2022.01); *G06V 10/761* (2022.01); *G06V 40/1365* (2022.01)

(56) References Cited

U.S. PATENT DOCUMENTS

| | | | | |
|---|---|---|---|---|
| 2020/0257873 | A1 | 8/2020 | Heo et al. | |
| 2020/0257875 | A1 | 8/2020 | Hall et al. | |
| 2020/0264756 | A1* | 8/2020 | Jin | G06V 40/1347 |
| 2021/0042496 | A1* | 2/2021 | Choe | G06F 21/32 |
| 2021/0142036 | A1* | 5/2021 | Andersen | G06V 40/1365 |
| 2021/0326553 | A1* | 10/2021 | Jin | G06F 3/041 |
| 2022/0067324 | A1 | 3/2022 | Chau et al. | |

FOREIGN PATENT DOCUMENTS

| | | | |
|---|---|---|---|
| CN | 115855311 | A | 3/2023 |
| CN | 115937916 | A | 4/2023 |

* cited by examiner

Temperature sensor
Transmission frequency
Terminal chip
Terminal device
Driving circuit
Protective layer
Upper electrode
Piezoelectric layer
Lower electrode
Signal data
Integrated chip
Terminal screen 300
301 301 301
First feature ...... First feature
301 301 301
First feature ...... First feature
301 301 301
First feature ...... First feature

METHOD AND APPARATUS FOR GENERATING FINGERPRINT IMAGE TO BE RECOGNIZED

RELATED APPLICATIONS

The present application is a Continuation of International Application Number PCT/IB2024/059122 filed on Sep. 20, 2024, which claims priority to Chinese Patent Application 202410177930.8, entitled "Method and Apparatus for Generating Fingerprint Image to Be Recognized", filed with the China National Intellectual Property Administration on Feb. 8, 2024, which is incorporated herein by reference in its entirety.

TECHNICAL FIELD

The present disclosure relates to the technical field of ultrasonic fingerprint recognition and, in particular, to a method and apparatus for generating a fingerprint image to be recognized.

BACKGROUND

In order to improve the security of various devices, protect user privacy, and provide convenience for users, fingerprint recognition-based unlocking technology has been widely used in various fields, including but not limited to personal devices such as smartphones and tablet PCs, as well as daily-use devices for access control, attendance checking, daily consumption, financial transaction verification, and the like.

According to existing fingerprint unlocking, the device controls a fingerprint recognition apparatus to transmit an ultrasonic signal to a fingerprint collection area. After a user presses the fingerprint collection area, the fingerprint recognition apparatus is controlled to process an ultrasonic echo signal to recognize the fingerprint of the user. Since the imaging of signal data is a mixed image including a fingerprint signal and a background signal, background subtraction process is required to obtain a fingerprint image.

However, since a background image of the background signal used in ultrasonic fingerprint processing is pre-collected, there is a long time interval between the background image and the mixed image obtained after the user presses the fingerprint collection area with his/her finger. This will lead to a huge difference between the mixed image and the background image in collection conditions, thereby bringing serious interference to background subtraction processing. As a result, the processed fingerprint image has low accuracy and fingerprint recognition accuracy is low, thereby causing illegal recognition and unlocking failures frequently.

SUMMARY

In view of this, the embodiments of the present disclosure provide a method and apparatus for generating a fingerprint image to be recognized. Since serious interference will be brought to the background subtraction process if the background image and signal imaging are quite different in collection conditions, the processed fingerprint image has low accuracy and fingerprint recognition accuracy is low, thereby causing illegal recognition, unlocking failures and the like frequently. The present disclosure can solve these problems.

To achieve the above objective, according to an aspect of the present disclosure, provided is a method for generating a fingerprint image to be recognized, including:

collecting a fingerprint image of a fingerprint;

using a first feature of the fingerprint image to match a target background image for the fingerprint image from a background image library, wherein the first feature of the fingerprint image is at least one of a signal flight time of an ultrasonic signal for generation of the fingerprint image, a signal transmission frequency of the ultrasonic signal for generation of the fingerprint image, or a collection time of the fingerprint image; and subtracting the target background image from the fingerprint image to obtain a fingerprint image to be recognized of the fingerprint.

According to another aspect of the present disclosure, provided is an apparatus for generating a fingerprint image to be recognized, including:

a collecting module, used to collect a fingerprint image of a fingerprint;

a matching module, used to use a first feature of the fingerprint image to match a target background image for the fingerprint image from a background image library, wherein the first feature of the fingerprint image is at least one of a signal flight time of an ultrasonic signal for generation of the fingerprint image, a signal transmission frequency of the ultrasonic signal for generation of the fingerprint image, or a collection time of the fingerprint image; and a data processing module, used to subtract the target background image from the fingerprint image to obtain a fingerprint image to be recognized of the fingerprint.

According to another aspect of the present disclosure, provided is an electronic device, including:

a processor; and a memory storing a program, wherein the program includes instructions, which, when executed by the processor, cause the processor to execute the method for generating a fingerprint image to be recognized.

According to yet another aspect of the present disclosure, provided is a non-transitory computer-readable storage medium storing computer instructions, where the computer instructions are used to cause the computer to execute the method for generating a fingerprint image to be recognized.

In one or more technical solutions provided in the embodiments of the present application, by using a built background image library, during the process of processing a fingerprint image of a mixed signal, a target background image with closest parameter characteristics relative to the mixed signal is selected from the background image library according to signal transmission frequency, signal flight time and the collection time of the fingerprint image, and the target background image is then subtracted from the fingerprint image to obtain a fingerprint signal with an excellent signal-to-noise ratio. In this way, the difference between the background signal during mixed signal collection and the background signal used for background subtraction can be reduced, signal interference during background subtraction can be avoided, and the accuracy of the fingerprint image can be improved. As a result, the fingerprint recognition accuracy is improved in various recognition scenarios and the frequent occurrence of illegal fingerprint recognition, unlocking failures, and the like can be avoided, thereby providing great convenience to users in fingerprint recognition and various operations such as unlocking and consumption after recognition.

BRIEF DESCRIPTION OF DRAWINGS

In the following description of exemplary embodiments in conjunction with the accompanying drawings, more details, features and advantages of the present disclosure are disclosed, and in the drawings.

DETAILED DESCRIPTION OF THE EMBODIMENTS

Figures 1, 2:
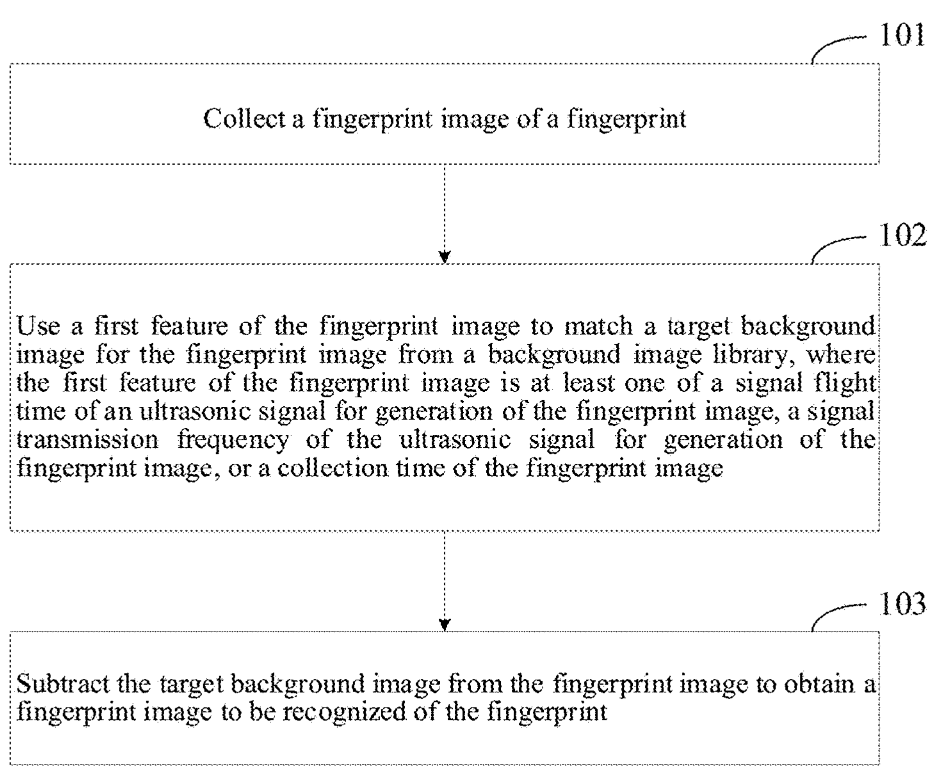
FIG. 1 is a flowchart of a method for generating a fingerprint image to be recognized according to an exemplary embodiment of the present disclosure.
FIG. 2 is a schematic diagram of a terminal device according to an exemplary embodiment of the present disclosure.

The embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth herein. Instead, these embodiments are provided to more thoroughly and completely understand the present disclosure. It should be understood that, the drawings and embodiments of the present disclosure are only for illustrative purposes and are not intended to limit the scope of the present disclosure.

It should be understood that the various steps described in the method embodiments of the present disclosure may be performed in different orders and/or in parallel. In addition, the method embodiments may include additional steps and/or omit the steps shown. The scope of the present disclosure is not limited in this respect.

The term "including" and its variations used herein are open inclusions, i.e., "including but not limited to". The term "based on" means "based at least in part on". The term "in an embodiment of the present disclosure" means "at least one embodiment"; the term "another exemplary embodiment" means "at least one other embodiment". The relevant definitions of other terms will be given in the following description. It needs to be noted that, the concepts such as "first" and "second" mentioned in the present disclosure are only used for distinguishing different apparatuses, modules or units, and are not intended to limit the order or interdependence relations of the functions executed by these apparatuses, modules or units.

It needs to be noted that, the modifications of "one" and "a plurality of" mentioned in the present disclosure are schematic rather than restrictive, and those skilled in the art should understand that, unless otherwise explicitly stated in the context, the "one" and "a plurality of" should be understood as "one or more".

The names of messages or information exchanged among a plurality of apparatuses in the implementation manners of the present disclosure are only for illustrative purposes and are not intended to limit the scope of these messages or information.

Commonly used background subtraction methods include: using background images with different reflectivity to eliminate fingerprint image interference and using multiple gain adjustment calculations to subtract background noise. The former is for optical fingerprints and the latter is for capacitive fingerprints. Both the two methods cannot be applied to ultrasonic fingerprint recognition.

In existing ultrasonic fingerprint recognition, an ultrasonic echo signal includes both a background signal and a fingerprint signal. During the processing, the background signal needs to be subtracted, and only the fingerprint image corresponding to the fingerprint signal is retained to recognize the fingerprint. An ultrasonic fingerprint recognizer will collect a background signal after each press ends and the user's finger is away from the fingerprint collection area, and then stores the background signal for background subtraction the next time the user presses the fingerprint collection area. Therefore, the background signal used for background subtraction of each user's press is usually collected after the previous press. For this reason, on the one hand, since there is no background signal for the first press, the first fingerprint recognition of each new user is bound to fail. On the other hand, due to the long time interval between the background signal and the mixed signal, various parameters of a device to be unlocked may have changed. For example, the temperature difference between indoor and outdoor in summer and winter leads to different signal collection temperatures and changes in the transmission frequency of ultrasonic signals, and the acoustic properties of the ultrasonic fingerprint recognizer's various acoustic layers (an upper electrode, a lower electrode, a piezoelectric layer, a protective layer, an adhesive layer, an integrated chip), a film, a screen, and the like may be changed, resulting in changes in the background signal. For example, the replacement of parts such as films and screens will change the signal flight time of ultrasonic signals at the same transmission frequency, causing changes in the background signal. This will lead to a huge difference between the background signal during mixed signal collection and the background signal during background subtraction collection, thereby bringing serious interference to background subtraction. In summary, the fingerprint image obtained after background subtraction processing may have low accuracy, which will in turn reduce the accuracy of fingerprint recognition, and frequently cause illegal recognition, unlocking failures and the like. For this reason, the user has to repeatedly operate and unlock the device, causing great inconvenience to the user.

The solutions of the present disclosure will be described below with reference to the accompanying drawings.

FIG. 1 is a flowchart of a method for generating a fingerprint image to be recognized according to an exemplary embodiment of the present disclosure. As shown in FIG. 1, the method for generating a fingerprint image to be recognized according to the present disclosure includes the following steps:

In an embodiment of the present disclosure, the method for generating a fingerprint image to be recognized according to the present disclosure may be executed by any fingerprint recognition chip or device. The implementation process of the method for generating a fingerprint image to be recognized according to the present disclosure is described below by taking fingerprint recognition on a terminal device as an example.

Further, the method for generating a fingerprint image to be recognized according to the present disclosure is executed by a system-level chip (hereinafter referred to as a system chip) of an electronic device. As shown in FIG. 2, the electronic device includes a screen of the electronic device, a system chip, an ultrasonic fingerprint recognizer, and a temperature sensor. The ultrasonic fingerprint recognizer includes a plurality of acoustic layers such as a driving circuit, a protective layer, an upper electrode, a piezoelectric layer, a lower electrode, an integrated chip, and an adhesive layer.

Step 101, collecting a fingerprint image of a fingerprint.

In the embodiment of the present disclosure, the system chip sends the signal transmission frequency of an ultrasonic signal to the ultrasonic fingerprint recognizer, and the ultrasonic fingerprint recognizer transmits the ultrasonic signal to the screen of the electronic device at the signal transmission frequency. In response to the user touches a fingerprint collection area on the screen of the electronic device with his/her finger, the system chip sends a recognition instruction to the ultrasonic fingerprint recognizer. The ultrasonic fingerprint recognizer collects an ultrasonic echo signal, generates a fingerprint image of a fingerprint of the user, and returns the fingerprint to the system chip. The fingerprint image here is formed by the superposition of a fingerprint signal and a background signal.

Further, or, the ultrasonic fingerprint recognizer can directly return the signal data of the ultrasonic echo signal to the system chip, and the system chip performs digital conversion and other processing to generate the fingerprint image of the fingerprint of the user, and the processing method can be selected according to actual needs.

Step 102, using a first feature of the fingerprint image to match a target background image for the fingerprint image from a background image library, wherein the first feature of the fingerprint image is at least one of a signal flight time of an ultrasonic signal for generation of the fingerprint image, a signal transmission frequency of the ultrasonic signal for generation of the fingerprint image, or a collection time of the fingerprint image.

In an embodiment of the present disclosure, an example is taken for description, where the first feature of the fingerprint image is the signal flight time of the ultrasonic signal for generation of the fingerprint image, the signal transmission frequency of the ultrasonic signal for generation of the fingerprint image, or the collection time of the fingerprint image. The fingerprint image is represented by Raw, and the image data of the fingerprint image Raw is stored in a matrix form of gray values of all pixels. The fingerprint image Raw includes X*Y pixels. The storage form of the image data of the fingerprint image Raw is the gray value matrix $$G^R_{X,Y}$$

of all pixels, and the gray value of each pixel is $$g^R_{x,y},$$

where $x \in [1,X], y \in [1,Y]$.

Further, in an embodiment of the present disclosure, the image features of the fingerprint image include a first feature, a second feature, a third feature, and a fourth feature, and the first feature, the second feature, the third feature, and the fourth feature are different from each other and are respectively one of the following four features: a signal flight time of the ultrasonic signal for generation of the fingerprint image, a signal transmission frequency of the ultrasonic signal for generation of the fingerprint image, a collection time of the fingerprint image, and a gray value matrix of the fingerprint image. The signal flight time refers to a time difference between the transmission time of the ultrasonic signal when the fingerprint image is generated and the reception time of the ultrasonic echo signal. The signal transmission frequency refers to the working frequency of the ultrasonic signal for generation the fingerprint image. The collection time refers to a timestamp when the fingerprint image is generated.

Alternatively, in another embodiment of the present disclosure, the image features of a sub image library include a first feature, a second feature, a third feature, a fourth feature and a fifth feature, and the first feature, the second feature, the third feature, the fourth feature and the fifth feature are different from each other and are respectively one of the following five features:

a signal flight time of the ultrasonic signal for generation of the fingerprint image, a signal transmission frequency of the ultrasonic signal for generation of the fingerprint image, a collection time of the fingerprint image, a collection temperature of an environment in which the electronic device that generates the fingerprint image is located, and a gray value matrix of the fingerprint image. The collection temperature refers to the temperature of the environment in which the electronic device is located when the fingerprint image is collected.

Figures 3A, 3B:
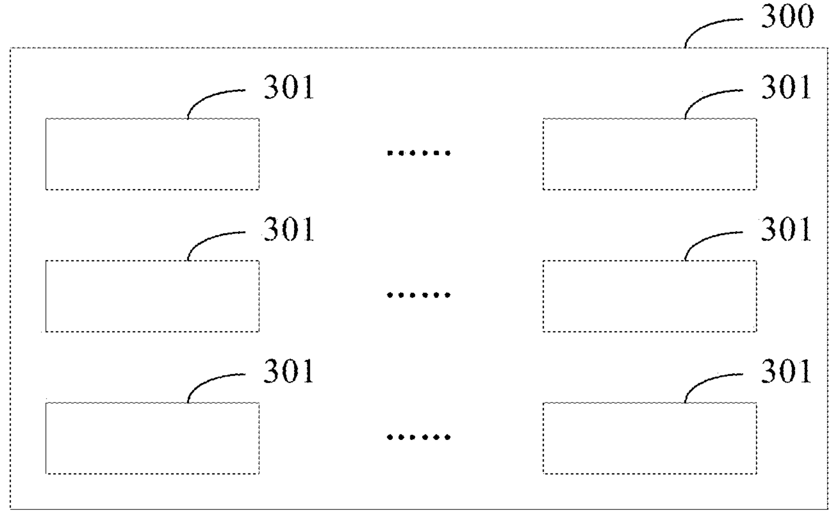
FIG. 3A is a schematic diagram of a background image library according to an embodiment of the present disclosure.
FIG. 3B is a schematic diagram of a sub image library according to a first exemplary embodiment of the present disclosure.

In an embodiment of the present disclosure, as shown in FIG. 3A, a background image library 300 includes a plurality of sub image libraries 301, each sub image library 301 may contain one or more background images, and the maximum number of background images that each sub image library 301 can contain, also known as the sub image library capacity, may be the same or different, and can be selectively set according to an actual recognition scenario. For example, the sub image library capacity is 10 to 25 images. The i-th background image in a sub image library is represented by $Base_i$, and the image data of the background image $Base_i$ is stored in a matrix form of gray values of all pixels. Assume that the background image $Base_i$ includes X*Y pixels, the storage form of the image data of the background image $Base_i$ is the gray value matrix $$G_{X,Y}^{Bi}$$

of all pixels, and the gray value of each pixel is $$g_{x,y}^{Bi},$$

where $x \in [1,X], y \in [1,Y]$.

Figure 3C:
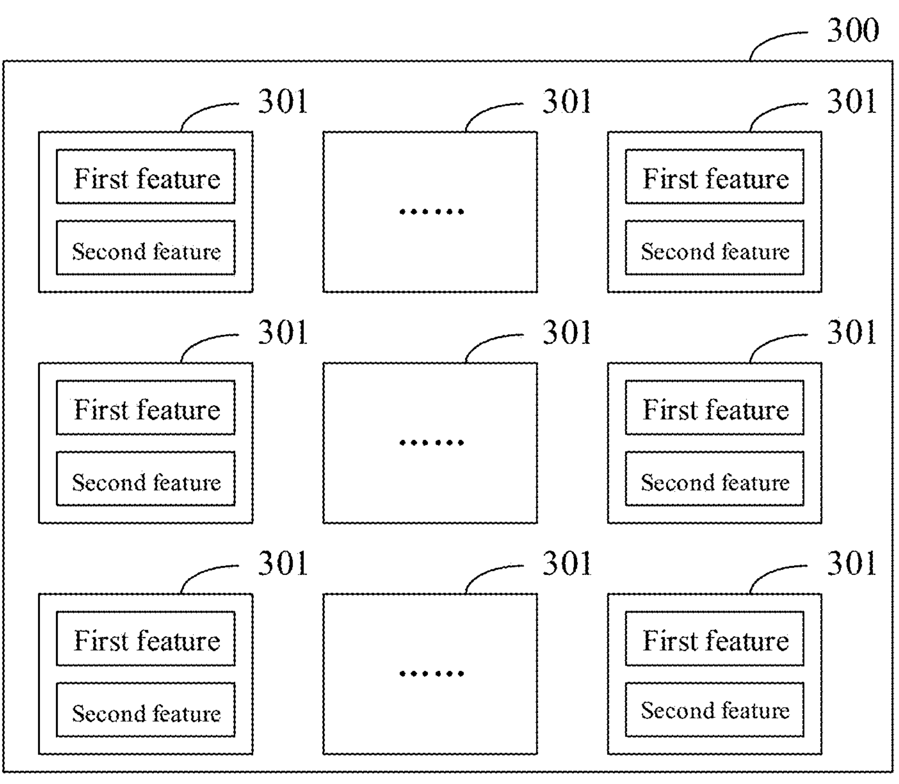
FIG. 3C is a schematic diagram of a sub image library according to a second exemplary embodiment of the present disclosure.
Figure 3D:
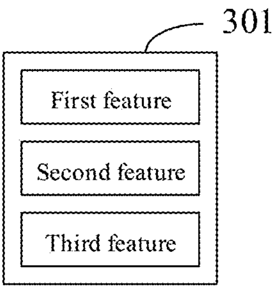
FIG. 3D is a schematic diagram of a sub image library according to a third exemplary embodiment of the present disclosure.

Further, in an embodiment of the present disclosure, the image features of the sub image library include a first feature, a second feature, a third feature and a fourth feature, and the first feature, the second feature, the third feature and the fourth feature are different from each other. The sub image libraries may be distinguished by the feature value of one or more image features of each background image in the background image library. For example, as shown in FIG. 3B, the sub image libraries may be distinguished by the feature value of the first feature of each background image. For another example, as shown in FIG. 3C, the sub image libraries may be distinguished by the feature values of the first feature and the second feature. For yet another example, as shown in FIG. 3D, the sub image libraries may be distinguished by the feature values of the first feature, the second feature and the third feature. Specifically, the first feature, the second feature, the third feature and the fourth feature are respectively one of the following four features:

a signal flight time of the ultrasonic signal for generation of each background image in the sub image libraries, a signal transmission frequency of the ultrasonic signal for generation of each background image in the sub image libraries, a collection time of each background image in the sub image libraries, and a gray value matrix of each background image in the sub image libraries. The signal transmission frequency refers to the working frequency of the ultrasonic signal corresponding to the generation of a background image, and the image feature of the sub image library is represented by the signal transmission frequency $f_i$. The signal flight time refers to a time difference between the transmission time of the ultrasonic signal for generation of the background and the reception time of the ultrasonic echo signal, and the image feature of the sub image library is represented by the signal flight time $flyt_i$. The collection time refers to the timestamp when the background image is generated, and the image feature of the sub image library is represented by the time interval $t_i$ of collection time.

Figure 4:
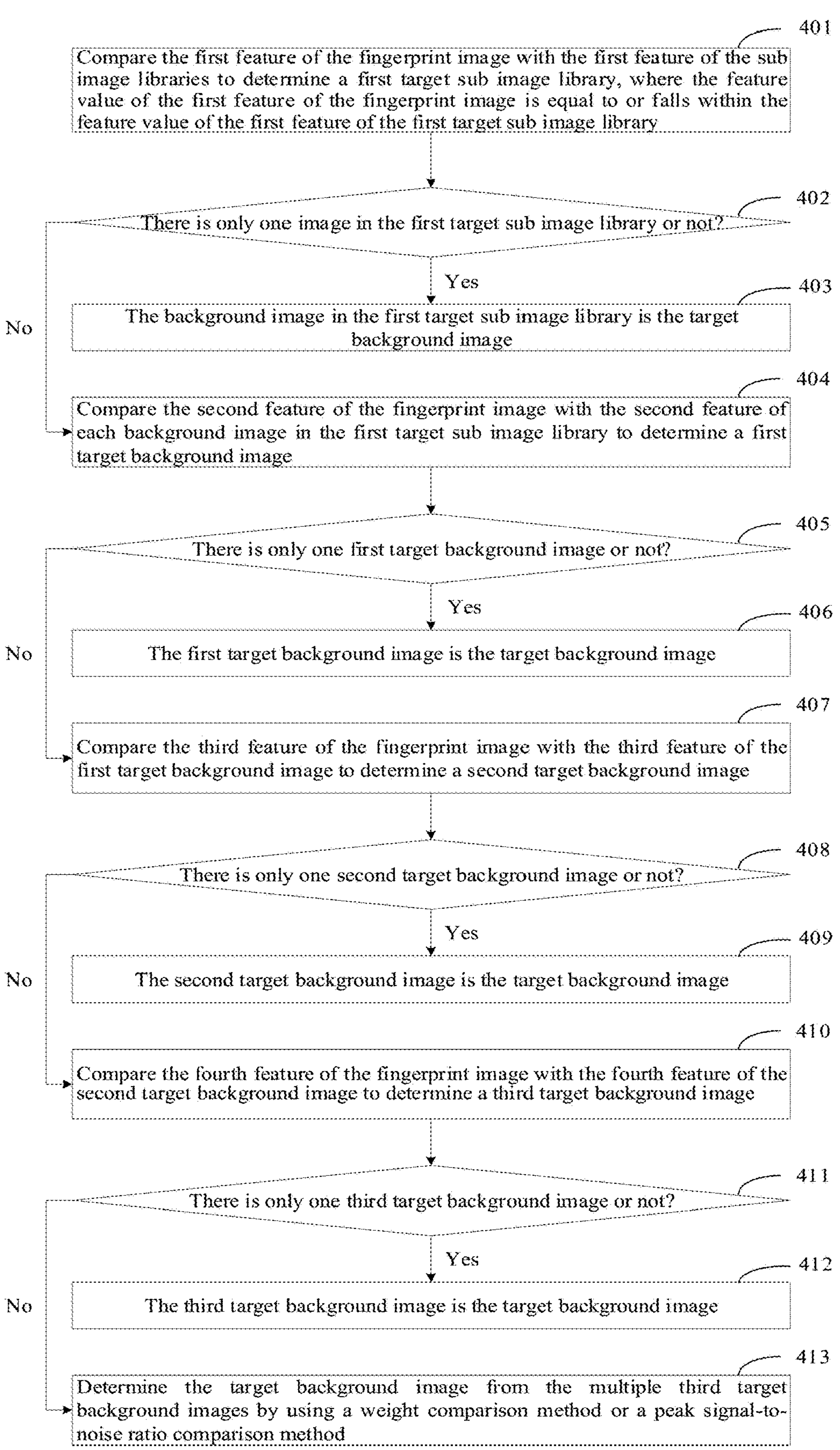
FIG. 4 is a flowchart of a method for matching a target background image according to the first exemplary embodiment of the present disclosure.

Still further, the sub image libraries are distinguished by the feature value of the first feature, and the first feature of the sub image libraries is the signal flight time, the signal transmission frequency, or the collection time. As shown in FIG. 4, a method for matching a target background image according to the first embodiment of the present disclosure includes the following steps:

Step 401, comparing the first feature of the fingerprint image with the first feature of the sub image libraries to determine a first target sub image library, wherein the feature value of the first feature of the fingerprint image is equal to or falls within the feature value of the first feature of the first target sub image library.

In an embodiment of the present disclosure, the system chip compares the first feature of the fingerprint image with the first feature of the sub image libraries to determine a first target sub image library which meets the condition that the feature value of the first feature of the fingerprint image is equal to the feature value of the first feature of the sub image library, or that the feature value of the first feature of the fingerprint image falls within the feature value of the first feature of the sub image library, so as to locate the first target sub image library.

Further, the feature value of the first feature of the fingerprint image is a single point value. For example, the fingerprint image has the signal flight time of 1150 ns, the signal transmission frequency of 11.1 MHz, and the collection time of Oct. 29, 2023-21:52:28. The feature value of the first feature of the first target sub image library may be a single point value or an interval of values. In the case where the first feature is the signal flight time, the feature value of the first feature is a single point value or an interval of values. For example, the first feature $flyt_5$ of the sub image library is 1100 ns, or, the first feature $flyt_7$ of the sub image library is [1100 ns, 1149 ns]. In the case where the first feature is the signal transmission frequency, the feature value of the first feature is a single point value. For example, the first feature $f_1$ of the sub image library is 11.1 MHz, and the first feature $f_2$ is 12.5 MHz. In the case where the first feature is the collection time, the feature value of the first feature is an interval of values. For example, the first feature $t_8$ of the sub image library is [Oct. 29, 2023-21:26:29, Oct. 29, 2023-22:26:28].

Step 402, determining whether there is only one image in the first target sub image library; if yes, performing step 403; if not, performing step 404.

In an embodiment of the present disclosure, the system chip determines whether there is only one image in the first target sub image library located according to the first feature.

Step 403, determining that the background image in the first target sub image library is a target background image.

In an embodiment of the present disclosure, in the case where there is only one image in the first target sub image library, the system chip takes the only one background image in the first target sub image library as the target background image.

Step 404, comparing the second feature of the fingerprint image with the second feature of each background image in the first target sub image library to determine a first target background image.

In an embodiment of the present disclosure, in the case where there are multiple images in the first target sub image library, the feature value of the second feature of the fingerprint image is further compared with the feature values of the second features of the multiple background images in the first target sub image library to determine one or more first target background images. The first target background image in step 404 meets a condition that: the feature value of the second feature of the fingerprint image is equal to or falls within the feature value of the second feature of the first target background image. In this embodiment, the first target background image that meets the condition is selected from the background images in the first target sub image library, wherein the feature value of the second feature of the first target background image may be a certain value or an interval of values.

Step 405, determining whether there is only one first target background image; if yes, performing step 406; if not, performing step 407.

In an embodiment of the present disclosure, the system chip determines whether there is only one first target background image located according to the second feature.

Step 406, determining that the first target background image is the target background image.

In an embodiment of the present disclosure, in the case where there is only one first target background image, the system chip takes the first target background image as the target background image.

Step 407, comparing the third feature of the fingerprint image with the third feature of the first target background images to determine a second target background image.

In an embodiment of the present disclosure, in the case where there are multiple first target background images, the feature value of the third feature of the fingerprint image is further compared with the feature values of the third features of the multiple first target background images to determine one or more second target background images. The second target background image in step 407 meets a condition that: the feature value of the third feature of the fingerprint image is equal to or falls within the feature value of the third feature of the second target background image. In this embodiment, the second target background image that meets the condition is selected from the first target background images, wherein the feature value of the third feature of the second target background image may be a certain value or an interval of values.

Step 408, determining whether there is only one second target background image; if yes, performing step 409; if not, performing step 410.

In an embodiment of the present disclosure, the system chip determines whether there is only one second target background image located according to the third feature.

Step 409, determining that the second target background image is the target background image.

In an embodiment of the present disclosure, in the case there is only one second target background image, the system chip takes the second target background image as the target background image.

Step 410, comparing the fourth feature of the fingerprint image with the fourth feature of the second target background images to determine a third target background image.

In an embodiment of the present disclosure, in the case where there are multiple second target background images, the feature value of the fourth feature of the fingerprint image is further compared with the feature values of the fourth features of the multiple second target background images to determine one or more third target background images. The third target background image in step 410 meets a condition that: the feature value of the fourth feature of the fingerprint image is equal to or falls within the feature value of the fourth feature of the third target background image. In this embodiment, the third target background image that meets the condition is selected from the second target background images, wherein the feature value of the fourth feature of the third target background image may be a certain value or an interval of values.

Step 411, determining whether there is only one third target background image; if yes, performing step 412; if not, performing step 413.

In an embodiment of the present disclosure, the system chip determines whether there is only one third target background image located according to the fourth feature.

Step 412, determining that the third target background image is the target background image.

In an embodiment of the present disclosure, in a case where there is only one third target background image, the system chip takes the third target background image as the target background image.

Step 413, determining the target background image from the multiple third target background images by using a weight comparison method or a peak signal-to-noise ratio comparison method.

In an embodiment of the present disclosure, in a case where the second feature is the gray value matrix, the comparing the second feature of the fingerprint image with the second feature of each background image in the first target sub image library to determine the first target background image includes: calculating image similarity between the gray value matrix of the fingerprint image and the gray value matrix of each background image in the first target sub image library, and determining the background image corresponding to the minimum value of the image similarity as the first target background image. In a case where the third feature is the gray value matrix, the comparing the third feature of the fingerprint image with the third feature of the first target background image to determine the second target background image includes: calculating the image similarity between the gray value matrix of the fingerprint image and the gray value matrix of the first target background image, and determining the first target background image corresponding to the minimum value of the image similarity as the second target background image. In a case where the fourth feature is the gray value matrix, the comparing the fourth feature of the fingerprint image with the fourth feature of the second target background image to determine the third target background image includes: calculating the image similarity between the gray value matrix of the fingerprint image and the gray value matrix of the second target background image, and determining the second target background image corresponding to the minimum value of the image similarity as the third target background image.

In an embodiment of the present disclosure, in the case where there are multiple third target background images, the system chip determines the target background image from the multiple third target background images by using the weight comparison method or the peak signal-to-noise ratio comparison method.

Figure 5:
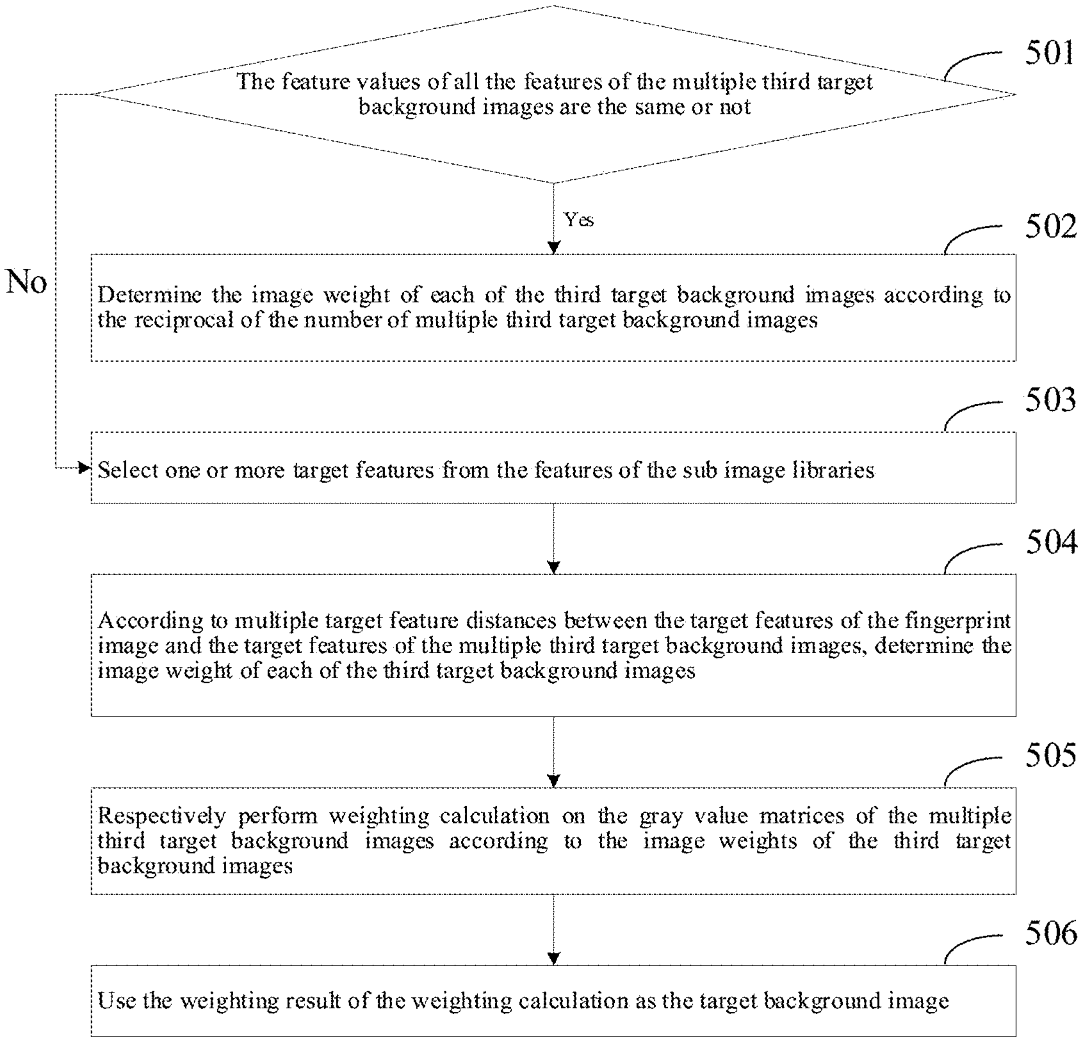
FIG. 5 is a flowchart of a method for determining a target background image by using a weight comparison method according to an exemplary embodiment of the present disclosure.

Further, as shown in FIG. 5, a method for determining a target background image by using a weight comparison method according to the present disclosure includes the following steps:

Step 501, determining whether the feature values of each feature of the multiple third target background images is the same; if yes, performing step 502; if not, performing step 503.

Step 502, determining the image weight of each of the third target background images according to the reciprocal of the number of the multiple third target background images.

In an embodiment of the present disclosure, in a case where the feature values of the features of the multiple third target background images are the same, the image weight of each of the third target background images may be determined according to the mean weight method. It should be noted that the gray value matrices of the multiple background images are generally different. In some embodiments, the case where the feature values of the features of the multiple third target background images are the same may be one or more of: the case where the multiple third target background images are all the same in signal flight time, the case where the multiple third target background images are all the same in signal transmission frequency, the multiple third target background images are all the same in collection time, or the multiple third target background images are all the same in collection temperature. Since the sum of the image weights of the multiple third target background images is 1, the sum of the weights is divided by the number of multiple third target background images to evenly distribute the image weights of the third target background images. That is, the image weight of each of the third target background image is the reciprocal of the number of images. Specifically:

The multiple third target background images are counted, and the reciprocal of the number of images counted is then calculated as the image weight of each of the third target background images. For example, if the number of third target background images is 5, the image weight of each of the third target background images is 0.2.

Step 503, selecting one or more target features from the features of the sub image libraries.

In the embodiment of the present disclosure, in a case where the feature values of the features of the multiple third target background images are different, one or more of the image features are selected as the target features to calculate the image weight of each of the third target background images.

Further, the target feature preferentially selects the image features with different feature values of the multiple third target background images. For example, the multiple third target background images are different in signal transmission frequency and collection time, and the target features are determined to be the signal transmission frequency $f_1$ and the collection time $t_i$.

Step 504, according to multiple target feature distances between the target features of the fingerprint image and the target features of the multiple third target background images, determining the image weight of each of the third target background images.

Step S041, calculating the multiple target feature distances between the feature values of the target features of the fingerprint image and the feature values of the target features of the multiple third target background images.

In an embodiment of the present disclosure, for example, the feature values of the target features of the fingerprint image Raw are $f_{Raw}$ and $t_{Raw}$, the feature values of the target features of the third target background image $Base_{3i}$ are $f_{B3i}$ and $t_{B3i}$, and the target feature distances between the fingerprint image and the third target background image are $|f_{Raw}-f_{B3i}|$ and $|t_{Raw}-t_{B3i}|$, respectively.

Step S042, normalizing the target feature distances.

In an embodiment of the present disclosure, for example, the normalization results of the target feature distances are expressed as:

$$F_{3i} = \frac{|f_{Raw} - f_{B3i}| - \min(|f_{Raw} - f_{B3i}|)}{\max(|f_{Raw} - f_{B3i}|) - \min(|f_{Raw} - f_{B3i}|)},$$

$$Q_{3i} = \frac{|t_{Raw} - t_{B3i}| - \min(|t_{Raw} - t_{B3i}|)}{\max(|t_{Raw} - t_{B3i}|) - \min(|t_{Raw} - t_{B3i}|)}.$$

Step S043, exponentially transforming the normalization results, and determining the image weight of each of the third target background images according to the reciprocals of exponential transformation results.

In an embodiment of the present disclosure, the transformation method of exponential transformation is to the power of .p; for example, the exponential transformation results of the normalization results are $(F_{3i})^p$ and $(Q_{3i})^p$.

Further, the feature similarity between the target features of the fingerprint image Raw and the third target background image $Base_{3i}$ is determined according to the reciprocals of the exponential transformation results; for example, the feature similarity is expressed as $$s_{3i} = \frac{1}{(F_{3i})^p + (Q_{3i})^p + 1}$$

In another embodiment, the target feature may also be a gray value matrix, and the feature similarity between the target features of the fingerprint image Raw and the third target background image $Base_{3i}$ may be expressed by the norm q (q≥0) between the gray value matrix $G_{Raw}$ of the fingerprint image Raw and the gray value matrix $G_{B3i}$ of the third target background image $Base_{3i}$, that is, the feature similarity $s_{3i}$ between the gray value matrices of the fingerprint image Raw and the third target background image $Base_{3i}$ may be expressed as:

$$s_{3i} = L_{3i}^q = \|G_{Raw} - G_{B3i}\|_q = \sqrt[q]{\sum_{j=0}^{j=X*Y} (G_{Raw} - G_{B3i})^q}$$

wherein, $G_{Raw}$ represents the gray value matrix of the fingerprint image Raw, $G_{B3i}$ represents the gray value matrix of the third target background image $Base_{3i}$, and $G_{Raw}$ and $G_{B3i}$ respectively have X*Y pixels.

Still further, the image weight of each of the third target background images $Base_{3i}$ is determined according to the ratio of each feature similarity to the sum of all feature similarities; for example, the image weight of each of the third target background images $Base_{3i}$ is expressed as $$w_{3i} = \frac{s_{3i}}{\sum_1^M s_{3i}}.$$

Step 505, respectively performing weighting calculation on the gray value matrices of the multiple third target background images according to the image weights of the third target background images.

In an embodiment of the present disclosure, the weighting algorithm of the weighting calculation may be selectively set as needed. For example, the weighting algorithm is linear weighting, and the weighting result of the weighting calculation that the system chip performs on M third target background images is expressed as:

$$\text{Base}_{final} = \sum_{i=1}^{M} k_i \times \text{Base}_{3i} \quad (1)$$

In the equation (1), $\text{Base}_{3i}$ is the gray value matrix of all pixels of the i-th third target background image;

$k_i$ is the image weight of the third target background images $\text{Base}_{3i}$;

M is the number of third target background images $\text{Base}_{3i}$, i=1,2,3, . . . , M.

Step 506, using a weighting result of the weighting calculation as the target background image.

In an embodiment of the present disclosure, the system chip uses the weighting result $\text{Base}_{final}$ from step 505 as the target background image of the fingerprint image. Since the influence of multiple third background images is taken into account, noise interference can be reduced.

Further, alternatively, the system chip may search, according to the image similarity, the background image library for a background image most similar to the weighting result $\text{Base}_{final}$ as the target background image of the fingerprint image.

Figure 6:
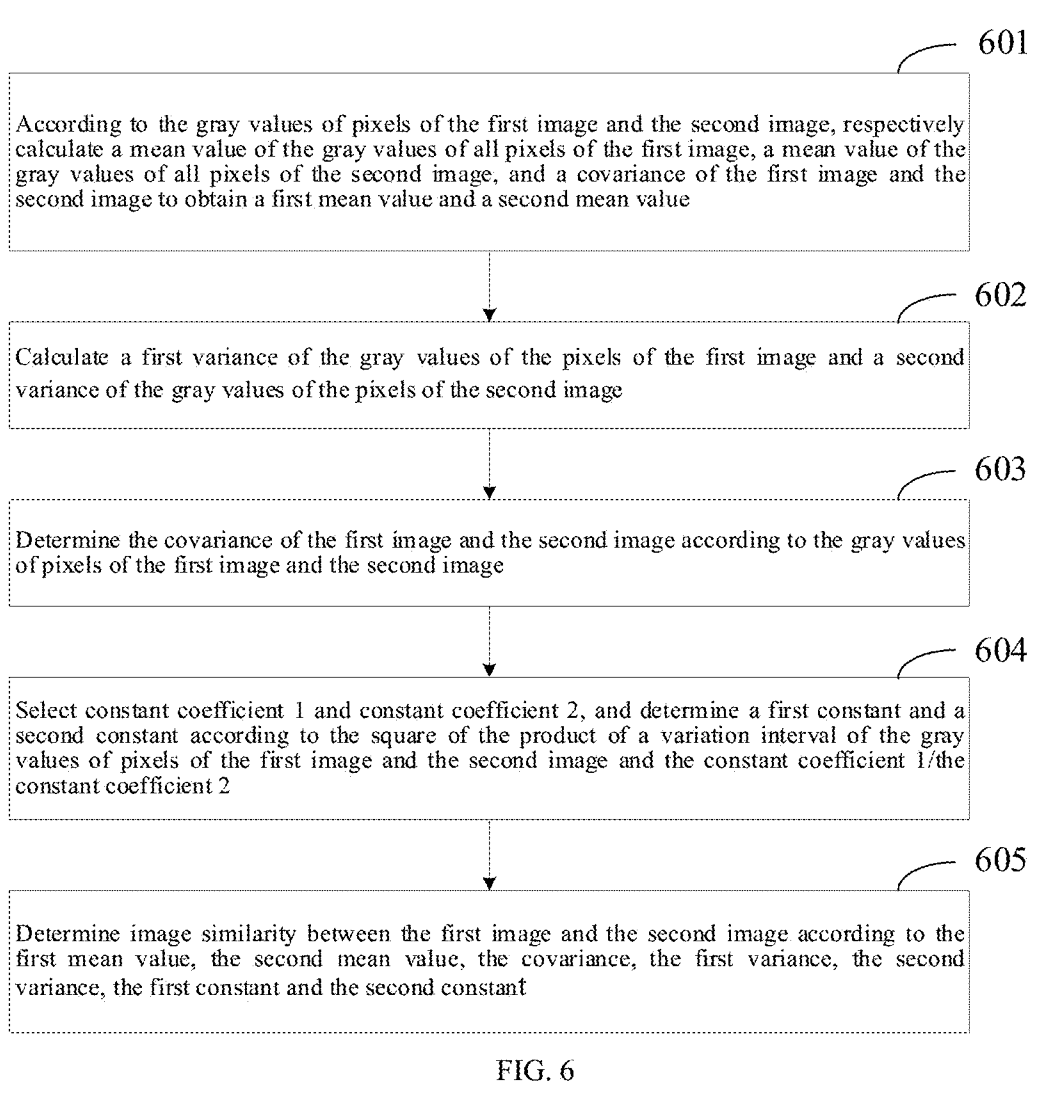
FIG. 6 is a flowchart of a method for determining image similarity according to an exemplary embodiment of the present disclosure.

Still further, as shown in FIG. 6, a method for determining image similarity according to the present disclosure includes the following steps:

In an embodiment of the present disclosure, the method for determining image similarity according to the present disclosure is used for determining image similarity between a first image and a second image.

Step 601, according to the gray values of pixels of the first image and the second image, respectively calculating a mean value of the gray values of all pixels of the first image, and a mean value of the gray values of all pixels of the second image to obtain a first mean value and a second mean value.

In an embodiment of the present disclosure, the first image is image A, including N pixels, and the gray value of each pixel in the gray value matrix of image A is represented by $A_i$, $i \in (1,2,3, \ldots, N)$; the second image is image B, including N pixels, and the gray value of each pixel in the gray value matrix of image B is represented by $B_i$. Accordingly, the first mean value $\mu_A$ and the second mean value $\mu_B$ are expressed as:

$$\mu_A = \sum_{i=1}^{N} A_i/N,\ \mu_B = \sum_{i=1}^{N} B_i/N \quad (2)$$

Step 602, calculating a first variance of the gray values of the pixels of the first image and a second variance of the gray values of the pixels of the second image.

In an embodiment of the present disclosure, the first variance $$\sigma_x^2$$

of $A_i$ and the second variance $$\sigma_y^2$$

of $B_i$ are calculated.

Step 603, determining a covariance of the first image and the second image according to the gray values of pixels of the first image and the second image.

Step 6031, respectively expanding the gray value matrices of the first image and the second image into a first conversion gray value matrix and a second conversion gray value matrix.

In an embodiment of the present disclosure, the gray value matrices including the gray values of all pixels of the first image and the second image are respectively expanded into one dimension to obtain a first conversion gray value matrix and a second conversion gray value matrix.

Step 6032, calculating a covariance of the first conversion gray value matrix and the second conversion gray value matrix as the covariance of the first image and the second image.

In an embodiment of the present disclosure, the covariance of the first conversion gray value matrix and the second conversion gray value matrix is calculated as the covariance $\sigma_{AB}$ of the first image and the second image.

Step 604, selecting constant coefficient 1 and constant coefficient 2, and determining a first constant and a second constant according to the square of the product of a variation interval of the gray values of pixels of the first image and the second image and the constant coefficient 1/the constant coefficient 2.

In an embodiment of the present disclosure, the constant coefficient 1 is represented by $k_1$, the constant coefficient 2 is represented by $k_2$, and the variation interval L is determined according to the difference between the maximum value $\max(A_i,B_i)$ and minimum value $\min(A_i,B_i)$ of all pixels of the first image and the second image. It should be noted that constant coefficient 1 $k_1$ and the constant coefficient 2 $k_2$ may be selectively set according to the gray value range of a fingerprint recognition scenario.

Further, the square of the product $(k_1L)^2$ of the variation interval Land the constant coefficient 1 $k_1$ is calculated as the first constant $c_1=(k_1L)^2$; the square of the product $(k_2L)^2$ of the variation interval Land constant coefficient 2 $k_2$ is calculated as the second constant $c_2=(k_2L)^2$.

Step 605, determining image similarity between the first image and the second image according to the first mean value, the second mean value, the covariance, the first variance, the second variance, the first constant and the second constant.

In an embodiment of the present disclosure, the image similarity $S_{A,B}$ between the first image A and the second image B is expressed as $$S_{A,B} = \frac{(2\mu_A\mu_B + c_1)(2\sigma_{AB} + c_2)}{(\mu_A^2 + \mu_B^2 + c_1)(\sigma_A^2 + \sigma_B^2 + c_2)} \quad (3)$$

In the equation (3), the range of $S_{A,B}$ is [0,1].

In an embodiment of the present disclosure, the method for determining image similarity according to the present disclosure can be used in the aforementioned scenario such as searching the background image library for the background image most similar to the weighting result, subsequent storage, and image similarity determination for target background image matching, to determine the similarity between the two images, thereby achieving the purpose of image matching, storage, and the like, ensuring the definition of the background image used for fingerprint recognition, and improving the accuracy of fingerprint recognition.

In an embodiment of the present disclosure, the method for determining a target background image by using a weight comparison method according to the present disclosure uses the image weights of multiple images and determines the weighting result as the target background image based on the gray values of pixels. Even if multiple background images are finally screened out based on various image parameters, the target background image with the acoustic characteristics closest to the fingerprint image can still be determined based on the weighting result, so as to accurately separate the fingerprint image to recognize a fingerprint.

Figure 7:
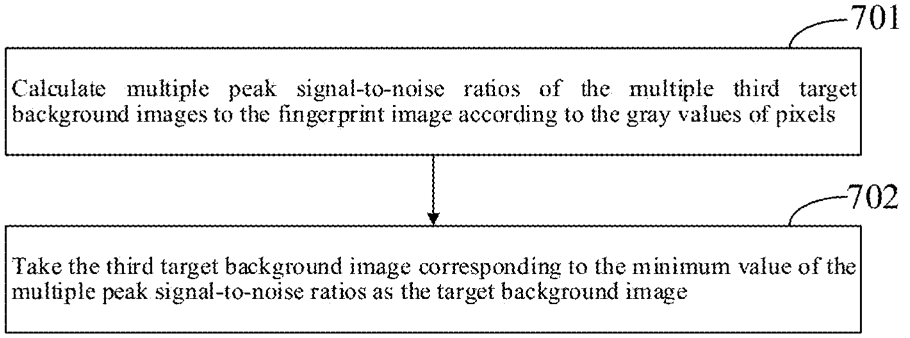
FIG. 7 is a flowchart of a method for determining a target background image by using a peak signal-to-noise ratio comparison method according to an exemplary embodiment of the present disclosure.

Alternatively, as shown in FIG. 7, a method for determining a target background image by using a peak signal-to-noise ratio comparison method according to the present disclosure includes the following steps:

Step 701, calculating multiple peak signal-to-noise ratios of the multiple third target background images to the fingerprint image according to the gray values of pixels.

Step 7011, for each third target background image, calculating a mean square error between the third target background image and the fingerprint image according to the gray values of pixels in the third target background image and the fingerprint image.

In an embodiment of the present disclosure, the mean square error between the i-th third target background image $Base_{3i}$ and the fingerprint image Raw is expressed as:

$$MSE_{B3i,R} = \sum_{y=1}^{y} \sum_{x=1}^{X} (Base_{3i,x,y} - Raw_{x,y})^2 / XY \tag{4}$$

In equation (4), the third target background image $Base_{3i}$ includes X*Y pixels, and the fingerprint image Raw includes X*Y pixels.

Step 7012, performing a logarithmic transformation on a ratio of the maximum gray value of the pixels in the fingerprint image to the mean square error to obtain a peak signal-to-noise ratio of the third target background image to the fingerprint image.

In an embodiment of the present disclosure, the peak signal-to-noise ratio $PSNR_{B3i,R}$ of the third target background image $Base_{3i}$ to the fingerprint image Raw is expressed as:

$$PSNR_{B3i,R} = 20 \square \log_{10}\left(\frac{\max(Raw_{x,y})}{\sqrt{MSE_{B3i,R}}}\right) \tag{5}$$

In equation (5), the higher the value of $PSNR_{B3i,R}$, the closer the third target background image $Base_{3i}$ is to the fingerprint image Raw; the lower the value of $PSNR_{B3i,R}$, the higher the distortion of the third target background image $Base_{3i}$ relative to the fingerprint image Raw.

Step 702, taking the third target background image corresponding to the minimum value of the multiple peak signal-to-noise ratios as the target background image.

In an embodiment of the present disclosure, the target background image is determined according to the minimum value of the peak signal-to-noise ratios $PSNR_{B3i,R}$ of the multiple third target background images to the fingerprint image Raw.

In an embodiment of the present disclosure, the method for determining a target background image by using a peak signal-to-noise ratio comparison method according to the present disclosure can determine the target background image closest to the fingerprint image from the multiple third target background images, so that the target background image closest to the acoustic response characteristics of the image parameters of the fingerprint image can be subsequently used to accurately separate a fingerprint signal. In this way, the noise of the background signal can be reduced and the definition of the separated fingerprint image can be improved, thereby improving the fingerprint recognition accuracy.

In an embodiment of the present disclosure, by the method for matching a target background image according to the first embodiment of the present disclosure, with the signal flight time, the signal transmission frequency, or the collection time as the first feature, and matching is performed level by level from the background image library until the target background image for the fingerprint image is determined. In this way, the matching efficiency and accuracy of the target background image for the fingerprint image can be improved, thereby improving the recognition efficiency and accuracy of the fingerprint.

Figure 3E:
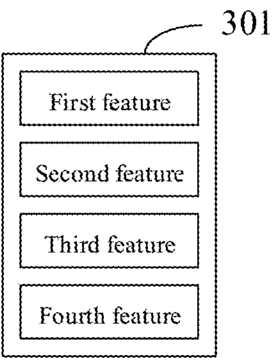
FIG. 3E is a schematic diagram of a sub image library according to a fourth exemplary embodiment of the present disclosure.

Alternatively, in another embodiment of the present disclosure, the image features of the sub image library include a first feature, a second feature, a third feature, a fourth feature and a fifth feature, and the first feature, the second feature, the third feature, the fourth feature and the fifth feature are different from each other. The sub image libraries may be distinguished by the feature value of one or more image features of each background image in the background image library. For example, as shown in FIG. 3B, the sub image libraries may be distinguished by the feature value of the first feature of each background image. For another example, as shown in FIG. 3C, the sub image libraries may be distinguished by the feature values of the first feature and the second feature. For yet another example, as shown in FIG. 3D, the sub image libraries may be distinguished by the feature values of the first feature, the second feature and the third feature. For still another example, as shown in FIG. 3E, the sub image libraries may be distinguished by the feature values of the first feature, the second feature, the third feature and the fourth feature. Specifically, the first feature, the second feature, the third feature, the fourth feature and the fifth feature are respectively one of the following five features:

a signal flight time of the ultrasonic signal for generation of each background image in the sub image libraries, a signal transmission frequency of the ultrasonic signal for generation of each background image in the sub image libraries, a collection time of each background image in the sub image libraries, a collection temperature of an environment in which the electronic device that generates each background image in the sub image libraries is located, and a gray value matrix of each background image in the sub image libraries. The collection temperature refers to the temperature of the environment in which the electronic device is located when the background image is collected. The image feature of the sub image libraries is represented by the collection temperature $T_i$.

Figure 8:
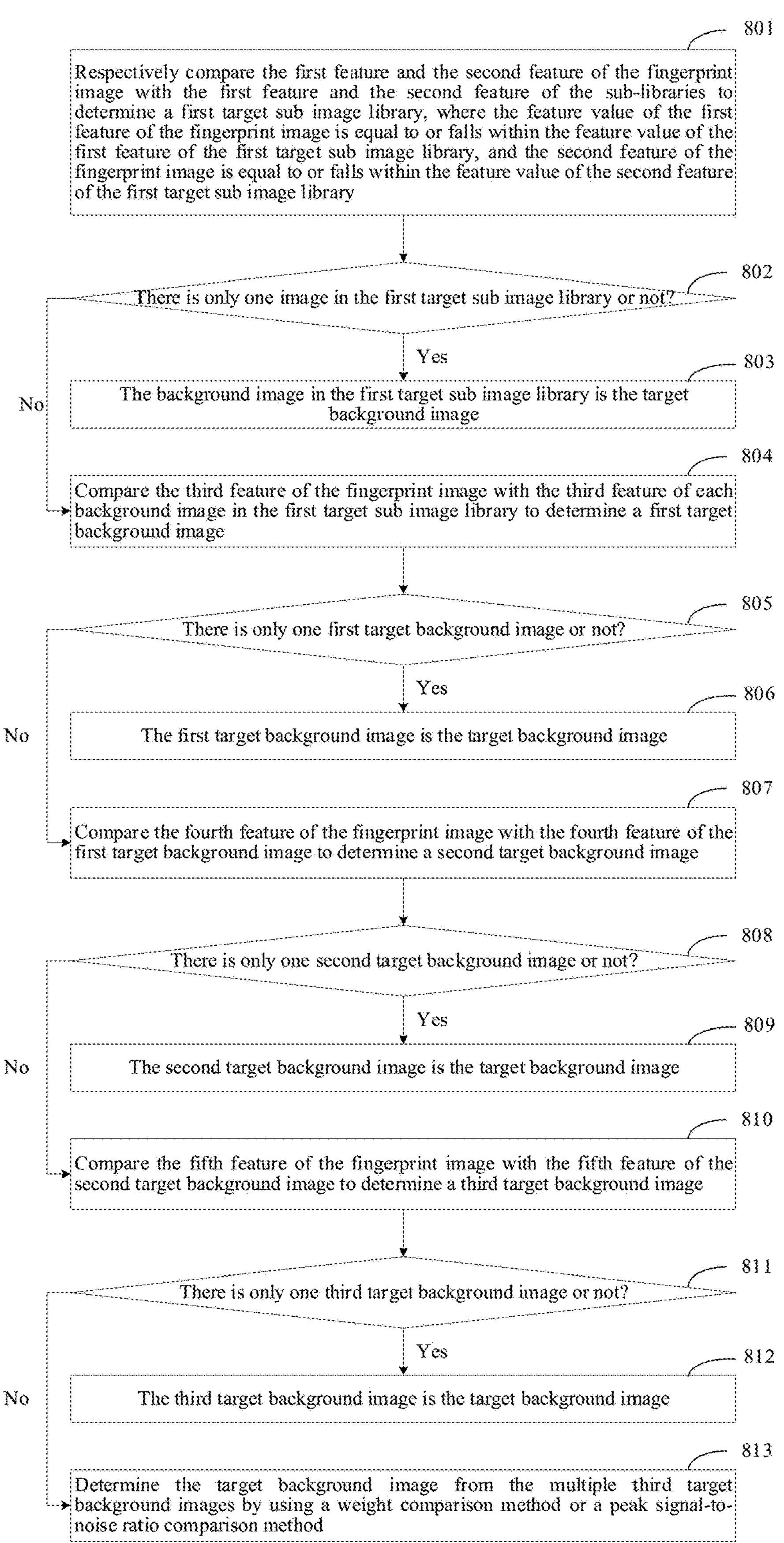
FIG. 8 is a flowchart of a method for matching a target background image according to the second exemplary embodiment of the present disclosure.

Still further, the sub image libraries are distinguished by the feature values of the first feature and the second feature, and the first feature and the second feature of the sub image libraries are two of the signal flight time, the signal transmission frequency, the collection time and the collection temperature. As shown in FIG. 8, a method for matching a target background image according to the second embodiment of the present disclosure includes the following steps:

Step 801, respectively comparing the first feature and the second feature of the fingerprint image with the first feature and the second feature of the sub image libraries to determine a first target sub image library, where the feature value of the first feature of the fingerprint image is equal to or falls within the feature value of the first feature of the first target sub image library, and the second feature of the fingerprint image is equal to or falls within the feature value of the second feature of the first target sub image library.

In an embodiment of the present disclosure, the system chip compares the first feature of the fingerprint image with the first feature of the sub image libraries and compares the second feature of the fingerprint image with the second feature of the sub image libraries to determine a first target sub image library which meets the condition that the feature value of the first feature of the fingerprint image is equal to or falls within the feature value of the first feature of the sub image library, and the feature value of the second feature of the fingerprint image is equal to or falls within the feature value of the second feature of the sub image libraries, so as to locate the first target sub image library.

Step 802, determining whether there is only one image in the first target sub image library; if yes, performing step 803; if not, performing step 804.

In an embodiment of the present disclosure, the system chip determines whether there is only one image in the first target sub image library located according to the first feature and the second feature.

Step 803, determining that the background image in the first target sub image library is the target background image.

In an embodiment of the present disclosure, in the case where there is only one image in the first target sub image library, the system chip takes the only one background image in the first target sub image library as the target background image.

Step 804, comparing the third feature of the fingerprint image with the third feature of each background image in the first target sub image library to determine a first target background image.

The first target background image in step 804 meets a condition that: the feature value of the third feature of the fingerprint image is equal to or falls within the feature value of the third feature of the first target background image. In this embodiment, the first target background image that meets the condition is selected from the background images in the first target sub image library, wherein the feature value of the third feature of the first target background image may be a certain value or an interval.

In an embodiment of the present disclosure, in the case where there are multiple images in the first target sub image library, the feature value of the third feature of the fingerprint image is further compared with the feature values of the third features of the multiple background images in the first target sub image library to determine one or more first target background images.

Step 805, determining whether there is only one first target background image; if yes, performing step 806; if not, performing step 807.

In an embodiment of the present disclosure, the system chip determines whether there is only one first target background image located according to the third feature.

Step 806, determining that the first target background image is the target background image.

In an embodiment of the present disclosure, in the case where there is only one first target background image, the system chip takes the first target background image as the target background image.

Step 807, comparing the fourth feature of the fingerprint image with the fourth feature of the first target background image to determine a second target background image.

In an embodiment of the present disclosure, in the case where there are multiple first target background images, the feature value of the fourth feature of the fingerprint image is further compared with the feature values of the fourth features of the multiple first target background images to determine one or more second target background images. The second target background image in step 807 meets a condition that: the feature value of the fourth feature of the fingerprint image is equal to or falls within the feature value of the fourth feature of the second target background image. In this embodiment, the second target background image that meets the condition is selected from the first target background images, wherein the feature value of the fourth feature of the second target background image may be a certain value or an interval.

Step 808, determining whether there is only one second target background image; if yes, performing step 809; if not, performing step 810.

In an embodiment of the present disclosure, the system chip determines whether there is only one second target background image located according to the fourth feature.

Step 809, determining that the second target background image is the target background image.

In an embodiment of the present disclosure, in the case there is only one second target background image, the system chip takes the second target background image as the target background image.

Step 810, comparing the fifth feature of the fingerprint image with the fifth feature of the second target background image to determine a third target background image.

In an embodiment of the present disclosure, in the case where there are multiple second target background images, the feature value of the fifth feature of the fingerprint image is further compared with the feature values of the fifth features of the multiple second target background images to determine one or more third target background images. The third target background image in step 810 meets a condition that: the feature value of the fifth feature of the fingerprint image is equal to or falls within the feature value of the fifth feature of the third target background image. In this embodiment, the third target background image that meets the condition is selected from the second target background images, wherein the feature value of the fifth feature of the third target background image may be a certain value or an interval.

Step 811, determining whether there is only one third target background image; if yes, performing step 812; if not, performing step 813.

In an embodiment of the present disclosure, the system chip determines whether there is only one third target background image located according to the fifth feature.

Step 812, determining that the third target background image is the target background image.

In an embodiment of the present disclosure, in a case where there is only one third target background image, the system chip takes the third target background image as the target background image.

Step 813, determining the target background image from the multiple third target background images by using a weight comparison method or a peak signal-to-noise ratio comparison method.

In an embodiment of the present disclosure, in a case where the third feature is the gray value matrix, the comparing the third feature of the fingerprint image with the third feature of each background image in the first target sub image library to determine a first target background image includes:

calculating image similarity between the gray value matrix of the fingerprint image and the gray value matrix of each background image in the first target sub image library, and determining the background image in the first target sub image library corresponding to the minimum value of the image similarity as the first target background image.

In a case where the fourth feature is the gray value matrix, the comparing the fourth feature of the fingerprint image with the fourth feature of the first target background image to determine the second target background image includes:

calculating the image similarity between the gray value matrix of the fingerprint image and the gray value matrix of the first target background image, and determining the first target background image corresponding to the minimum value of the image similarity as the second target background image.

In a case where the fifth feature is the gray value matrix, the comparing the fifth feature of the fingerprint image with the fifth feature of the second target background image to determine the third target background image includes:

calculating the image similarity between the gray value matrix of the fingerprint image and the gray value matrix of the second target background image, and determining the second target background image corresponding to the minimum value of the image similarity as the third target background image.

In an embodiment of the present disclosure, in the case where there are multiple third target background images, the system chip determines the target background image from the multiple third target background images by using a weight comparison method or a peak signal-to-noise ratio comparison method.

In an embodiment of the present disclosure, by the method for matching a target background image according to the second embodiment of the present disclosure, with two of the signal flight time, the signal transmission frequency, the collection time and the collection temperature as the first feature and the second feature, the occurrence of recognition failure caused by too many background images matched based only on the collection temperature is avoided. By combining multiple features to match the target background image step by step, the matching efficiency and accuracy of the target background image for the fingerprint image can be improved, thereby improving the recognition efficiency and accuracy of the fingerprint.

In an embodiment of the present disclosure, since the acoustic impedance of the material at each layer of the ultrasonic fingerprint recognizer changes with the environment in which the terminal device is located, the sound wave penetration strength of the ultrasonic signal is different and background images collected at different signal transmission frequencies have different imaging definition. Similarly, since different film thickness, screen thickness, acoustic layer thickness, or the like will cause the recognition path of the ultrasonic signal to be different in length, background images collected at different signal flight time have different imaging definition. That is, the signal transmission frequency and signal flight time have a greater impact on the imaging definition of the background images. During fingerprint recognition, in order to improve the efficiency and accuracy of fingerprint recognition, the signal flight time and signal transmission frequency that have a greater impact on the imaging definition of the background images are preferably used as the first feature and the second feature. Accordingly, the first feature is the signal flight time and the second feature is the signal transmission frequency; or, the first feature is the signal transmission frequency and the second feature is the signal flight time.

Further, as the collection time of the fingerprint image approaches, correspondingly the background image collected is also closer and closer to the response parameters of the fingerprint image. Therefore, the third feature is preferably the collection time.

In an embodiment of the present disclosure, during the generation of a background image library, in order to avoid interference caused by various collection conditions to fingerprint recognition, multiple signal transmission frequencies are set under different environmental conditions to collect background images to be stored, and multiple signal flight time is set under different film thickness, screen thickness, material thickness and other conditions to collect background images to be stored to construct a background image library. Therefore, during fingerprint recognition, the signal transmission frequency and the signal flight time can be preferentially selected as the first feature and the second feature, and the target background image closest to the collection conditions of the fingerprint image can be quickly matched from the background image library, thereby improving the efficiency and accuracy of fingerprint recognition.

Figures 9, 10, 11:
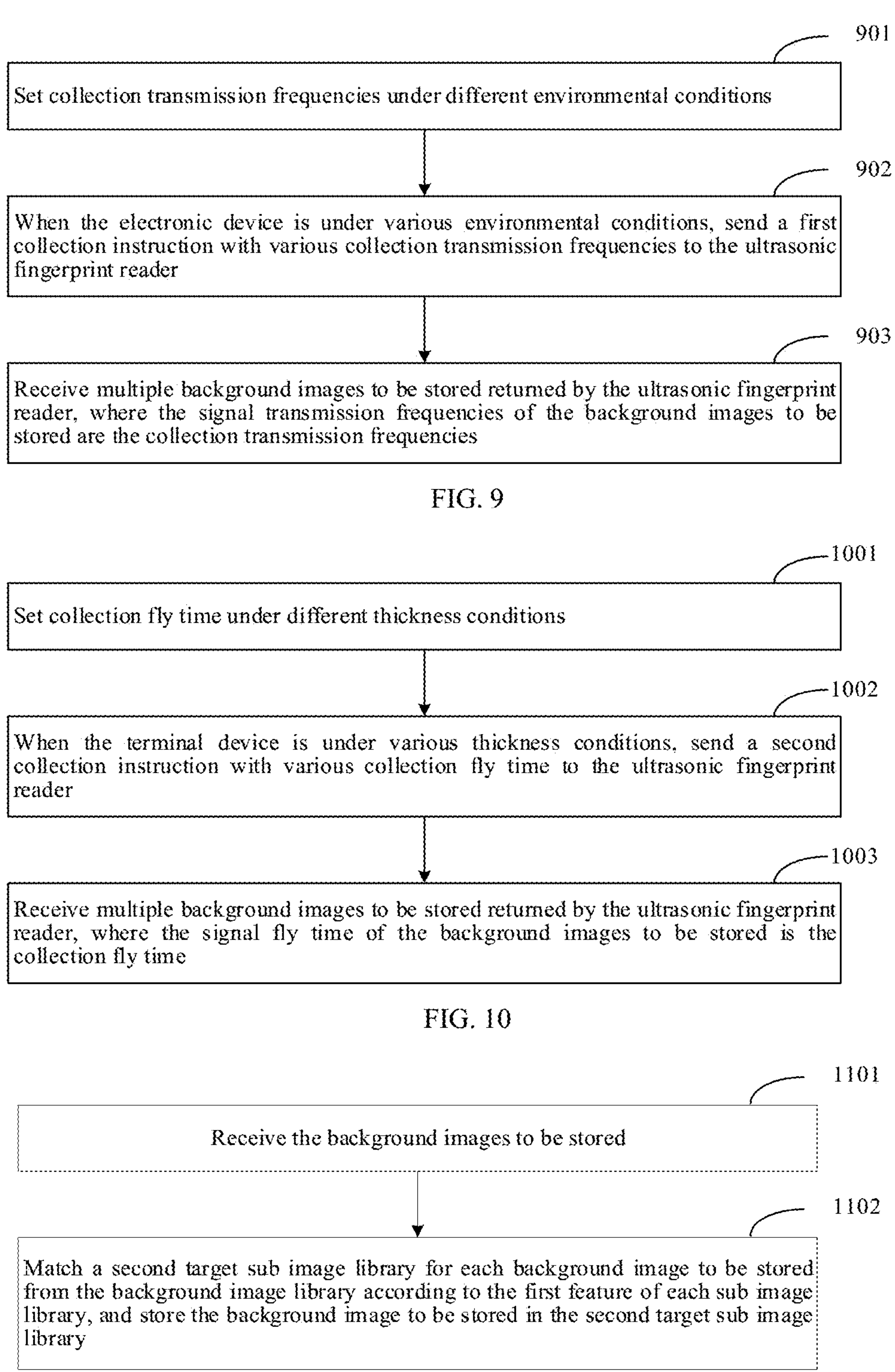
FIG. 9 is a flowchart of a method for collecting a background image to be stored according to the first exemplary embodiment of the present disclosure.
FIG. 10 is a flowchart of a method for collecting a background image to be stored according to the second exemplary embodiment of the present disclosure.
FIG. 11 is a flowchart of a method for storing a background image to be stored according to an exemplary embodiment of the present disclosure.

Further, as shown in FIG. 9, a method for collecting a background image to be stored according to the first exemplary embodiment of the present disclosure includes the following steps:

Step 901, setting collection transmission frequencies under different environmental conditions.

In an embodiment of the present disclosure, the environmental conditions include geographical location, ambient temperature, ambient brightness, ambient humidity, ambient air pressure, rain, snow, fog, and interference from other electromagnetic devices, which can be set in a diversified manner as needed to improve the coverage of the background images to be stored, so that the collected background images to be stored are diverse and can meet the accurate fingerprint recognition of the electronic device under various environmental conditions. For example, multiple longitude and latitude coordinates with large differences in longitude and latitude are selected as geographical locations for collection. The ambient temperature may be artificially changed by temperature increase and other operations or changed with the geographical location, and multiple temperature values which have a large span and gradually increases at a preset step size are selected for collection. The ambient brightness may be considered to be changed by blocking and other operations or changed with the geographical location, and multiple brightness values which have a large span and gradually increases at a preset step length are selected for collection.

The collection transmission frequency may be selectively set to different levels as needed. After the collection transmission frequencies are set at the system chip, the system chip controls the ultrasonic fingerprint recognizer to perform collection according to various collection transmission frequencies. For example, the collection transmission frequencies include: $f_1$=11.1 MHz, and $f_2$=12.5 MHz.

Step 902, when the electronic device is under various environmental conditions, sending a first collection instruction with various collection transmission frequencies to the ultrasonic fingerprint recognizer.

In an embodiment of the present disclosure, after the environmental conditions and the collection transmission frequencies are set, the electronic device is placed under various environmental conditions, and the system chip generates a first collection instruction according to the set various collection transmission frequencies and sends the first collection instruction to the ultrasonic fingerprint recognizer. In response to the first collection instruction, the ultrasonic fingerprint recognizer controls the driving circuit to transmit ultrasonic signals to the screen of the electronic device through the piezoelectric layer at the collection transmission frequencies, and then the integrated chip of the ultrasonic fingerprint recognizer collects ultrasonic echo signals to generate background images to be stored.

Step 903, receiving multiple background images to be stored returned by the ultrasonic fingerprint recognizer, wherein the signal transmission frequencies of the background images to be stored are the collection transmission frequencies.

In an embodiment of the present disclosure, the system chip receives the collected background images to be stored under different environmental conditions at different collection transmission frequencies returned by the ultrasonic fingerprint recognizer, and the signal transmission frequencies of the background images to be stored are the collection transmission frequencies.

As shown in FIG. 10, a method for collecting a background image to be stored according to the second exemplary embodiment of the present disclosure includes the following steps:

Step 1001, setting collection flight time under different thickness conditions.

In an embodiment of the present disclosure, the thickness conditions include the screen thickness of a terminal screen, the film thickness of a terminal film, and the acoustic layer thickness of each acoustic layer of the ultrasonic fingerprint recognizer, which can be set in a diversified manner as needed to improve the coverage of the background images to be stored, so that the collected background images to be stored are diverse and can meet the accurate fingerprint recognition of the terminal device under various thickness conditions. For example, the screen thicknesses of various terminal screens, films of different materials or thicknesses, acoustic layers of different materials or thicknesses and the like may be selected.

The collection flight time may be selectively set to different levels as needed. After the collection flight time is set at a terminal chip, the terminal chip controls the ultrasonic fingerprint recognizer to perform collection according to various collection flight time. For example, the collection flight time includes: $t_1$=1100 ns, $t_2$=1150 ns, and $t_3$=1200 ns.

Step 1002, when the terminal device is under various thickness conditions, sending a second collection instruction with various collection flight time to the ultrasonic fingerprint recognizer.

In an embodiment of the present disclosure, after the thickness conditions and the collection flight time is set, terminal devices with different screen thicknesses are selected or different films and acoustic layers are changed for a terminal device, and then the terminal chip generates a second collection instruction under various thickness conditions according to the set various collection flight time and sends the second collection instruction to the ultrasonic fingerprint recognizer. In response to the second collection instruction, the ultrasonic fingerprint recognizer controls the driving circuit to transmit ultrasonic signals to a terminal screen through the piezoelectric layer according to the various collection flight time, and then the integrated chip of the ultrasonic fingerprint recognizer collects ultrasonic echo signals to generate background images to be stored.

Step 1003, receiving multiple background images to be stored returned by the ultrasonic fingerprint recognizer, wherein the signal flight time of the background images to be stored is the collection flight time.

In an embodiment of the present disclosure, the terminal chip receives the collected background images to be stored under different thickness conditions at different collection flight time returned by the ultrasonic fingerprint recognizer, and the signal flight time of the background images to be stored is the collection flight time.

In an embodiment of the present disclosure, by the method for collecting a background image to be stored according to the present disclosure, different collection conditions are set to collect background images to be stored, and then a background image library including diversified background images can be constructed to provide a selection basis for matching the target background image closest to the response characteristics of the fingerprint image, thereby avoiding background interference caused by different collection conditions, reducing the noise of the background images, improving the accuracy of fingerprint recognition, and ensuring accurate fingerprint recognition.

Further, the method for collecting a background image to be stored according to the present disclosure may be executed regularly to update the background image library in real time to ensure accurate fingerprint recognition.

Still further, to construct a background image library based on the background images to be stored collected by the method for collecting a background image to be stored according to the present disclosure, similar to the method for matching a target background image from the background image library, it is also performed by first determining a sub image library based on a first feature and then determining whether a background image to be stored is stored based on whether the sub image library is full and whether there is an existing background image, in the sub image library, the same as the background image to be stored. The same procedures are repeated round and round and then the background image library can be determined by using the background images to be stored collected by the method for collecting a background image to be stored according to the present disclosure. As shown in FIG. 11, a method for storing a background image to be stored according to the present disclosure includes the following steps:

Step 1101, receiving the background images to be stored.

Step 1102, matching a second target sub image library for each background image to be stored from the background image library according to the first feature of each sub image library, and storing the background image to be stored in the second target sub image library.

In an embodiment of the present disclosure, the system chip matches a target sub image library for the background images to be stored from the background image library according to the first feature, and stores the background images to be stored in the target sub image library.

Figure 12:
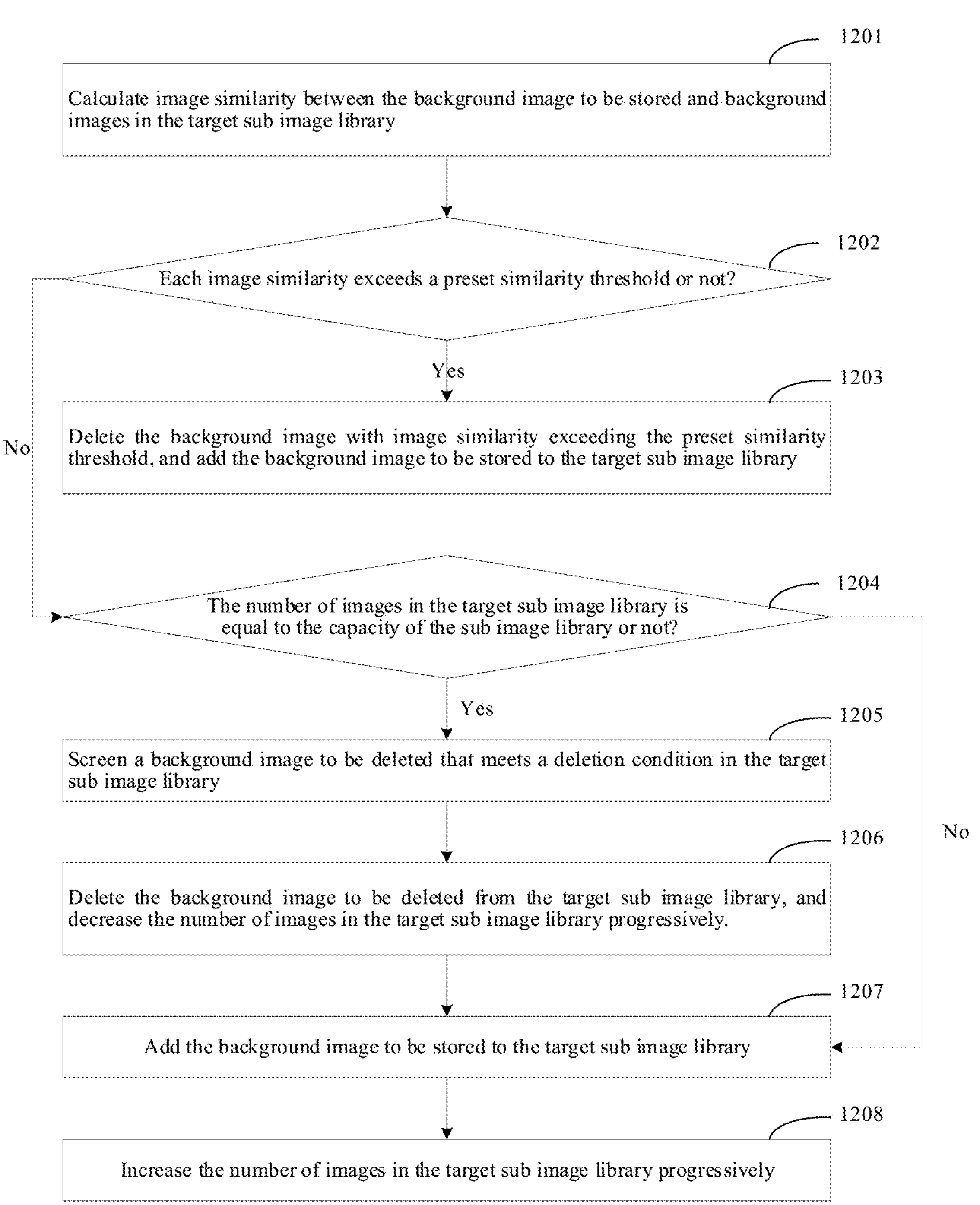
FIG. 12 is a flowchart of a method for storing a background image to be stored according to an exemplary embodiment of the present disclosure.

Further, as shown in FIG. 12, a method for storing a background image to be stored according to the present disclosure includes the following steps:

Step 1201, calculating image similarity between the background image to be stored and background images in the target sub image library.

In an embodiment of the present disclosure, the method for determining image similarity according to the present disclosure may be used to calculate the image similarity between the background image to be stored and the background images in the target sub image library.

Step 1202, determining whether each image similarity exceeds a preset similarity threshold; if yes, performing step 1203; if not, performing step 1204.

Step 1203, deleting the background image with image similarity exceeding the preset similarity threshold, and adding the background image to be stored to the target sub image library.

In an embodiment of the present disclosure, in a case where the image similarity between the background image and the background image to be stored exceeds the preset similarity threshold, it means that there is an image, in the target sub image library, the same as the background image to be stored, so the old image is deleted, and the background image to be stored is stored in the target sub image library.

Further, alternatively, in the case where the image similarity between the background image and the background image to be stored exceeds the preset similarity threshold, the background image to be stored may be rejected from being stored, and the storage result of the background image to be stored is determined to be storage failure.

Step 1204, determining whether the number of images in the target sub image library is equal to the capacity of the sub image library; if yes, performing step 1205; if not, performing step 1207.

In an embodiment of the present disclosure, in a case where the image similarity between the background image and the background image to be stored does not exceed the preset similarity threshold, whether the target sub image library is full is determined.

Step 1205, screening a background image to be deleted that meets a deletion condition in the target sub image library.

In an embodiment of the present disclosure, in the case where the number of images in the target sub image library is equal to the capacity of the sub image library, it means that the target sub image library is full, so some images need to be deleted to release space for the background image to be stored, thereby ensuring the real-time update of the background image library. The deletion condition may be earliest storage time, latest storage time, earliest collection time, latest collection time, most concentrated image features other than the first feature, most concentrated image features other than the first feature and the second feature, highest image similarity with the background image to be stored, or the like. For example, the first feature and the second feature of the sub image library are the signal flight time and the signal transmission frequency, respectively, and the image features other than the first feature and the second feature include the collection time and the collection temperature, and the deletion condition is that the most concentrated feature is collection temperature and/or the collection time.

Step 1206, deleting the background image to be deleted from the target sub image library, and decreasing the number of images in the target sub image library progressively.

Step 1207, adding the background image to be stored to the target sub image library.

In an embodiment of the present disclosure, in the case where the number of images in the target sub image library is not equal to the capacity of the sub image library, it means that the sub image library can contain new images, and then the background image to be stored is directly added to the target sub image library. Alternatively, after the background image to be deleted in the target sub image library is deleted, the background image to be stored is added to the target sub image library.

Step 1208, increasing the number of images in the target sub image library progressively.

In an embodiment of the present disclosure, after the background image to be stored is added to the target sub image library, the number of images in the target sub image library is increased progressively.

In an embodiment of the present disclosure, by the method for storing a background image to be stored according to the present disclosure, depending on whether the capacity of the target sub image library is full, it is determined whether to store the background image to be stored directly or to delete some existing background images to release the memory before storing the background image to be stored. In this way, the fingerprint recognition environment can be flexibly adapted to update the background image library, and the target background image with the closest parameter characteristics can be matched for the fingerprint image, thereby ensuring accurate subtraction of background signals and accurate recognition of the fingerprint signal, and improving the accuracy of fingerprint recognition.

Step 103, subtracting the target background image from the fingerprint image to obtain a fingerprint image to be recognized of the fingerprint.

In an embodiment of the present disclosure, the system chip subtracts the target background image from the fingerprint image to obtain the fingerprint image to be recognized that only includes the accurate fingerprint signal, and the fingerprint image may be used for subsequent unlocking, payment and other scenarios to improve the efficiency of fingerprint recognition and ensure the accuracy of fingerprint recognition.

Still further, since the background image library is pregenerated, even for the user's first press, an accurate target background image can be recommended for the fingerprint image, and a clean fingerprint signal to be recognized can be obtained after subtraction to accurately recognize the fingerprint. In the meanwhile, the background image library is constantly updated and iterated, so the parameter characteristics of various background images obtained from the background image library can be infinitely close to the mixed signal, thereby greatly decreasing the difference between the background signal of the target background image and the background signal in the mixed signal and further reducing the signal interference with the background subtraction. The obtained fingerprint image to be recognized has high accuracy, thereby improving the accuracy of fingerprint recognition, avoiding the frequent occurrence of illegal recognition and unlocking failures, and improving the user's convenience in various scenarios.

In an embodiment of the present disclosure, by the method for generating a fingerprint image according to the present disclosure, background signal interference caused by changes in the environment, thickness, or the like of ultrasonic signals can be avoided, and in any fingerprint recognition environment, a target background image that is closest to the response characteristics of the fingerprint image can be selected from the background image library according to the signal transmission frequency, signal flight time, and/or collection time to accurately separate the fingerprint signal. First recognition failure will not be caused by the inability to recognize the fingerprint by subtraction due to the absence of the background image during the first recognition, and the noise interference of the background signals is greatly reduced. The fingerprint image is clear and accurate, and the recognition accuracy is high, thereby avoiding the frequent occurrence of illegal recognition, unlocking failures and the like, and improving the convenience and success rate of users in various usage scenarios such as fingerprint unlocking and payment.

Figure 13:
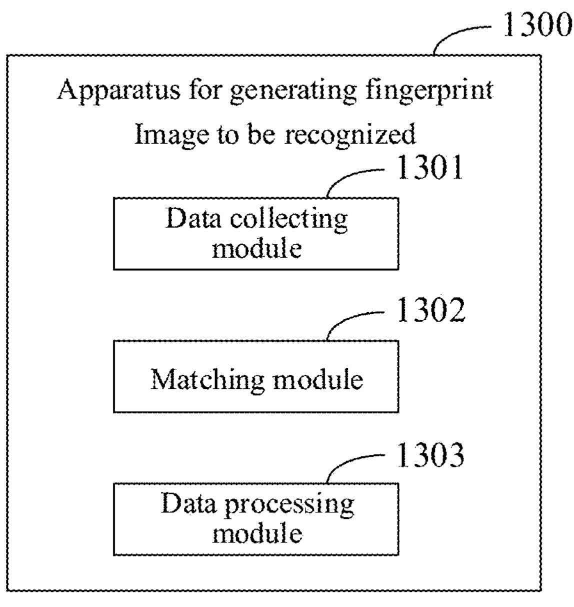
FIG. 13 is a schematic block diagram of an apparatus for generating a fingerprint image to be recognized according to an exemplary embodiment of the present disclosure.

FIG. 13 is a schematic block diagram of main modules in an apparatus for generating a fingerprint image to be recognized according to an embodiment of the present disclosure. As shown in FIG. 13, the apparatus 1300 for generating a fingerprint image to be recognized according to the present disclosure includes:

- a collecting module 1301, used to collect a fingerprint image of a fingerprint in response to a recognition instruction issued by a user's finger touch;
- a matching module 1302, used to match a target background image for the fingerprint image from the background image library according to the signal flight time and signal transmission frequency of the fingerprint image; and
- a data processing module 1303, used to subtract the target background image from the fingerprint image to obtain a fingerprint image to be recognized of the fingerprint.

An exemplary embodiment of the present disclosure further provides an electronic device, including: at least one processor; and a memory connected to the at least one processor in a communication manner. The memory stores a computer program that can be executed by at least one processor, and the computer program is used to cause the electronic device to execute the method according to the embodiment of the present disclosure when executed by the at least one processor.

An exemplary embodiment of the present disclosure further provides a non-transitory computer-readable storage medium storing a computer program, where the computer program is used to cause the computer to execute the method according to the embodiment of the present disclosure when executed by the processor of the computer.

An exemplary embodiment of the present disclosure further provides a computer program product, including a computer program, where the computer program is used to cause the computer to execute the method according to the embodiment of the present disclosure when executed by the processor of the computer.

Figure 14:
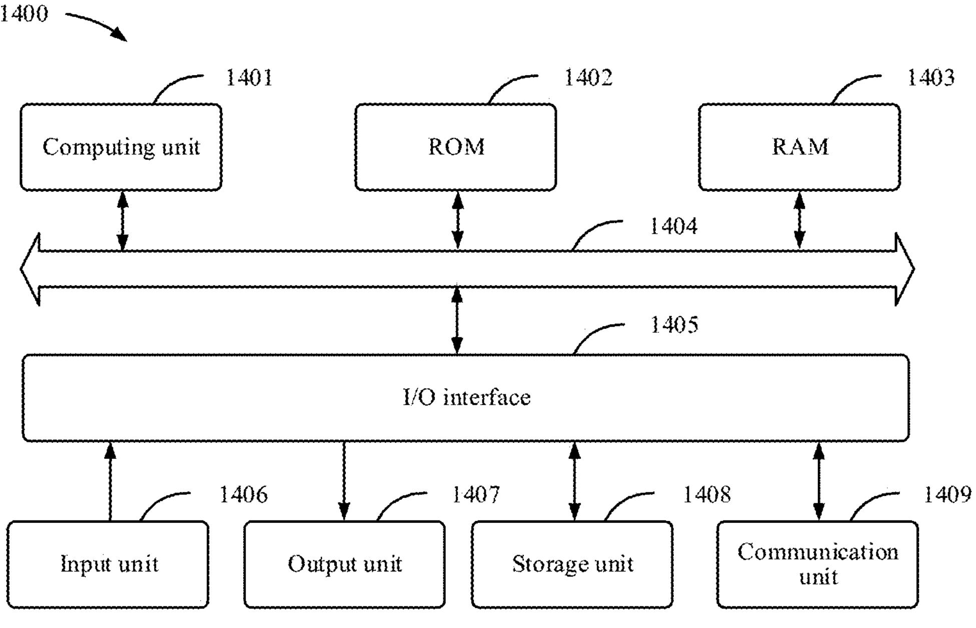
FIG. 14 is a structural block diagram of an exemplary electronic device that can be used to implement an embodiment of the present disclosure.

Referring to FIG. 14, a structural block diagram of an electronic device 1400 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 14, the electronic device 1400 includes a computing unit 1401, which may perform various appropriate actions and processing according to a computer program stored in a read-only memory (ROM) 1402 or a computer program loaded from a storage unit 1408 to a random access memory (RAM) 1403. The RAM 1403 may further store various programs and data required for the operation of the device 1400. The computing unit 1401, the ROM 1402, and the RAM 1403 are connected to each other by a bus 1404. An input/output (I/O) interface 1405 is also connected to the bus 1404.

Multiple components in the electronic device 1400 are connected to the I/O interface 1405 and the multiple components include: an input unit 1406, an output unit 1407, the storage unit 1408, and a communication unit 1409. The input unit 1406 may be any type of device capable of entering information to the electronic device 1400. The input unit 1406 can receive entered digit or character information, and generate a key signal input related to user settings and/or function control of the electronic device. The output unit 1407 may be any type of device capable of presenting information, and may include, but is not limited to, a display, a speaker, a video/audio output terminal, a vibrator, and/or a printer. The storage unit 1408 may include, but is not limited to, a magnetic disk and an optical disc. The communication unit 1409 allows the electronic device 1400 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a Wi-Fi device, a WiMAX device, a cellular communication device, and/or the like.

The computing unit 1401 may be various general-purpose and/or special-purpose processing components with processing and computing capabilities. Some examples of the computing unit 1401 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1401 performs the various methods and processing described above. For example, in some embodiments, the methods of FIGS. 1 and 4 to 12 may be implemented as a computer software program, which is tangibly contained in a machine-readable medium, such as the storage unit 1408. In some embodiments, the computer program may be, in part or completely, loaded and/or installed onto the electronic device 1400 via the ROM 1402 and/or the communication unit 1409. In some embodiments, the computing unit 1401 may be configured, by any other suitable means (for example, by means of firmware), to execute the methods of FIGS. 1 and 4 to 12.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

As used therein, the terms 'machine-readable medium' and 'computer-readable medium' refer to any computer program products, devices, and/or apparatuses (such as magnetic disks, optical disks, memories, and programmable logic apparatuses (PLDs)) used for providing the machine instructions and/or data to the programmable processor, and include machine-readable mediums that receive the machine instructions which are taken as machine-readable signals. The term 'machine-readable signal' refers to any signal used for providing the machine instructions and/or data to the programmable processor. In order to provide interaction with a user, the systems and technologies described herein may be implemented in a computer, the computer is provided with: a display apparatus (such as a CRT (cathode ray tube) or an LCD (liquid crystal display) monitor) used for displaying information to the user; and a keyboard and a pointing apparatus (such as a mouse or a trackball), and the user may provide input to the computer through the keyboard and the pointing apparatus. Other types of apparatuses may also be used for providing interaction with the user; for example, feedback provided to the user may be sensory feedback in any form (such as visual feedback, auditory feedback, or tactile feedback); and the input of the user may be received in any form (including vocal input, speech input, or tactile input). The systems and technologies described herein may be implemented in a computing system (for example, as a data server) including a background component, or a computing system (for example, an application server) including a middleware component, or a computing system (for example, a user computer with a graphical user interface or a web browser through which the user may interact with the implementation manners of the systems and technologies described herein) including a front-end component, or a computing system including any combination of the background component, the middleware component, or the front-end component. The components of the system may be connected with each other through digital data communication (for example, a communication network) in any form or medium. Examples of the communication network include: a local area network (LAN), a wide area network (WAN), and the Internet. The computer system may include a client and a server. The client and the server are generally far away from each other and usually interact through the communications network. A relationship between the client and the server is generated by computer programs running in respective computers and having a client-server relationship with each other.

What is claimed is:

1. A method for generating a fingerprint image to be recognized, comprising:

collecting a fingerprint image of a fingerprint;

using a first feature of the fingerprint image to match a target background image for the fingerprint image from a background image library, wherein the first feature of the fingerprint image is at least one of a signal flight time of an ultrasonic signal for generation of the fingerprint image, a signal transmission frequency of the ultrasonic signal for generation of the fingerprint image, or a collection time of the fingerprint image; and subtracting the target background from the fingerprint image to obtain a fingerprint image to be recognized of the fingerprint;

wherein the background image library comprises a plurality of sub image libraries, and the plurality of sub image libraries are distinguished by feature values of the first feature and a second feature, and the first feature and the second feature of the sub image libraries are two of a signal flight time of an ultrasonic signal for generation of each background image in the sub image libraries, a signal transmission frequency of the ultrasonic signal for generation of each background image in the sub image libraries, a collection time of each background image in the sub image libraries, and a collection temperature of an environment in which an electronic device that generates each background image in the sub image libraries is located.

2. The method according to claim 1, wherein the background image library comprises a plurality of sub image libraries, and the plurality of sub image libraries are distinguished by a feature value of a first feature of the sub image libraries, and the first feature of the sub image libraries is a signal flight time of an ultrasonic signal for generation of each background image in the sub image libraries, a signal transmission frequency of the ultrasonic signal for generation of each background image in the sub image libraries, or a collection time of each background image in the sub image libraries; the using the first feature of the fingerprint image to match a target background image for the fingerprint image from the background image library comprises:

comparing the first feature of the fingerprint image with the first feature of the sub image libraries to determine a first target sub image library, wherein the feature value of the first feature of the fingerprint image is equal to or falls within the feature value of the first feature of the first target sub image library;

determining whether there is only one image in the first target sub image library; if yes, determining the background image in the first target sub image library as a target background image;

in a case where there are multiple images in the first target sub image library, comparing a second feature of the fingerprint image with a second feature of each background image in the first target sub image library to determine a first target background image, wherein the feature value of the second feature of the fingerprint image is equal to or falls within the feature value of the second feature of the first target background image; wherein the second feature of the fingerprint image is one of a signal flight time of the ultrasonic signal for generation of the fingerprint image, a signal transmission frequency of the ultrasonic signal for generation of the fingerprint image, a collection time of the fingerprint image, and a gray value matrix of the fingerprint image, the second feature of each background image is one of a signal flight time of an ultrasonic signal for generation of the background image, a signal transmission frequency of the ultrasonic signal for generation of the background image, a collection time of the background image, and a gray value matrix of the background image, and the second feature is different from the first feature; and in a case where there is only one first target background image, determining the first target background image as the target background image;

in a case where there are multiple first target background images, comparing a third feature of the fingerprint image with a third feature of each first target background image to determine a second target background image, wherein the feature value of the third feature of the fingerprint image is equal to or falls within the feature value of the third feature of the second target background image; wherein the third feature of the fingerprint image is one of a signal flight time of the ultrasonic signal for generation of the fingerprint image, a signal transmission frequency of the ultrasonic signal for generation of the fingerprint image, a collection time of the fingerprint image, and a gray value matrix of the fingerprint image, the third feature of each first target background image is one of a signal flight time of an ultrasonic signal for generation of the first target background image, a signal transmission frequency of the ultrasonic signal for generation of the first target background image, a collection time of the first target background image, and a gray value matrix of the first target background image, and the third feature is different from the first feature and the second feature; and in a case where there is only one second target background image, determining the second target background image as the target background image;

in a case where there are multiple second target background images, comparing a fourth feature of the fingerprint image with a fourth feature of each second target background image to determine a third target background image, wherein the feature value of the fourth feature of the fingerprint image is equal to or falls within the feature value of the fourth feature of the third target background image; wherein the fourth feature of the fingerprint image is one of a signal flight time of the ultrasonic signal for generation of the fingerprint image, a signal transmission frequency of the ultrasonic signal for generation of the fingerprint image, a collection time of the fingerprint image, and a gray value matrix of the fingerprint image, the fourth feature of each second target background image is one of a signal flight time of an ultrasonic signal for generation of the second target background image, a signal transmission frequency of the ultrasonic signal for generation of the second target background image, a collection time of the second target background image, and a gray value matrix of the second target background image, and the fourth feature is different from the first feature, the second feature and the third feature; and in a case where there is only one third target background image, determining the third target background image as the target background image;

in a case where there are multiple third target background images, determining the target background image from the multiple third target background images by using a weight comparison method or a peak signal-to-noise ratio comparison method.

3. The method according to claim 2, wherein in a case where the second feature is the gray value matrix, the comparing the second feature of the fingerprint image with the second feature of the background images in the first target sub image library to determine a first target background image comprises:

calculating image similarity between the gray value matrix of the fingerprint image and the gray value matrix of each background image in the first target sub image library, and determining the first target background image according to the minimum value of the image similarity;

in a case where the third feature is the gray value matrix, the comparing the third feature of the fingerprint image with the third feature of the first target background image to determine a second target background image comprises:

calculating image similarity between the gray value matrix of the fingerprint image and the gray value matrix of the first target background image, and determining the second target background image according to the minimum value of the image similarity;

in a case where the fourth feature is the gray value matrix, the comparing the fourth feature of the fingerprint image with the fourth feature of the second target background image to determine a third target background image comprises:

calculating image similarity between the gray value matrix of the fingerprint image and the gray value matrix of the second target background image, and determining the third target background image according to the minimum value of the image similarity.

4. The method according to claim 3, wherein calculating image similarity between the gray value matrix of the fingerprint image and the gray value matrix of each background image in the first target sub image library, the first target background image or the second target background image comprises:

for each background image in the first target sub image library, the first target background image or the second target background image, calculating a mean value of matrix elements in the gray value matrix of the fingerprint image and a mean value of matrix elements in the gray value matrix of the background image respectively to obtain a first mean value and a second mean value respectively, and calculating a first variance of the matrix elements in the gray value matrix of the fingerprint image and a second variance of the matrix elements in the gray value matrix of the background image;

expanding the gray value matrices of the fingerprint image and the background image into a first unidimensional conversion gray value matrix and a unidimensional second conversion gray value matrix respectively, and calculating the covariance of the first conversion gray value matrix and the second conversion gray value matrix;

selecting constant coefficient 1 and constant coefficient 2, and determining a first constant and a second constant respectively according to the square of the product of a maximum difference a variation interval of the gray values of the matrix elements between the fingerprint image and the background image and the constant coefficient 1/the constant coefficient 2; and determining image similarity between the fingerprint image and the background image according to the first mean value, the second mean value, the covariance, the first variance, the second variance, the first constant and the second constant.

5. The method according to claim 2, wherein the first feature is the signal flight time and the second feature is the signal transmission frequency; alternatively, the first feature is the signal transmission frequency and the second feature is the signal flight time.

6. The method according to claim 2, wherein the determining the target background image from the multiple third target background images by using a weight comparison method comprises:

selecting one or more target features from the features of the sub image libraries and according to multiple target feature distances between the target features of the fingerprint image and the target features of the multiple third target background images, determining the image weight of each of the third target background images, wherein the target feature of the fingerprint image is the signal flight time of the ultrasonic signal for generation of the fingerprint image, the signal transmission frequency of the ultrasonic signal for generation of the fingerprint image, the collection time of the fingerprint image, the gray value matrix of the fingerprint image, or the collection temperature of an environment in which the electronic device that generates the fingerprint image is located, and the target feature of each third target background image is a signal flight time of an ultrasonic signal for generation of the third target background image, a signal transmission frequency of the ultrasonic signal for generation of the third target background image, a collection time of the third target background image, a gray value matrix of the third target background image, or a collection temperature of an environment in which an electronic device that generates the third target background image is located;

respectively performing weighting calculation on the gray value matrices of the multiple third target background images according to the image weights of the third target background images; and using a weighting result of the weighting calculation is used as the target background image.

7. The method according to claim 2, wherein the determining the target background image from the multiple third target background images by using a peak signal-to-noise ratio comparison method comprises:

for each third target background image, calculating a mean square error between the third target background image and the fingerprint image according to the gray values of pixels in the third target background image and the fingerprint image;

performing a logarithmic transformation on a ratio of the maximum gray value of the pixels in the fingerprint image to the mean square error to obtain a peak signal-to-noise ratio of the third target background image to the fingerprint image; and taking the third target background image corresponding to the minimum value of multiple peak signal-to-noise ratios as the target background image.

8. The method according to claim 1, wherein the first feature and the second feature of the fingerprint image are two of a signal flight time of an ultrasonic signal for generation of the fingerprint image, a signal transmission frequency of the ultrasonic signal for generation of the fingerprint image, a collection time of the fingerprint image, and a collection temperature of an environment in which an electronic device that generates the fingerprint image is located; the using the first feature of the fingerprint image to match a target background image for the fingerprint image from the background image library comprises:

respectively comparing the first feature and the second feature of the fingerprint image with the first feature and the second feature of the sub image libraries to determine a first target sub image library, wherein the feature value of the first feature of the fingerprint image is equal to or falls within the feature value of the first feature of the first target sub image library, and the second feature of the fingerprint image is equal to or falls within the feature value of the second feature of the first target sub image library;

determining whether there is only one image in the first target sub image library; if yes, determining the background image in the first target sub image library as a target background image;

in a case where there are multiple images in the first target sub image library, comparing a third feature of the fingerprint image with a third feature of each background image in the first target sub image library to determine a first target background image, wherein the feature value of the third feature of the fingerprint image is equal to or falls within the feature value of the third feature of the first target background image; wherein the third feature of the fingerprint image is one of a signal flight time of the ultrasonic signal for generation of the fingerprint image, a signal transmission frequency of the ultrasonic signal for generation of the fingerprint image, a collection time of the fingerprint image, a collection temperature of the fingerprint image, and a gray value matrix of the fingerprint image, the third feature of each background image is one of a signal flight time of an ultrasonic signal for generation of the background image, a signal transmission frequency of the ultrasonic signal for generation of the background image, a collection time of the background image, a collection temperature of the background image, and a gray value matrix of the background image, and the third feature is different from the first feature and the second feature; and in a case where there is only one first target background image, determining the first target background image as the target background image;

in a case where there are multiple first target background images, comparing a fourth feature of the fingerprint image with a fourth feature of each first target background image to determine a second target background image, wherein the feature value of the fourth feature of the fingerprint image is equal to or falls within the feature value of the fourth feature of the second target background image; wherein the fourth feature of the fingerprint image is one of a signal flight time of the ultrasonic signal for generation of the fingerprint image, a signal transmission frequency of the ultrasonic signal for generation of the fingerprint image, a collection time of the fingerprint image, a collection temperature of the fingerprint image, and a gray value matrix of the fingerprint image, the fourth feature of each first target background image is one of a signal flight time of an ultrasonic signal for generation of the first target background image, a signal transmission frequency of the ultrasonic signal for generation of the first target background image, a collection time of the first target background image, a collection temperature of the first target background image, and a gray value matrix of the first target background image, and the fourth feature is different from the first feature, the second feature and the third feature; and in a case where there is only one second target background image, determining the second target background image as the target background image;

in a case where there are multiple second target background images, comparing a fifth feature of the fingerprint image with a fifth feature of each second target background image to determine a third target background image, wherein the feature value of the fifth feature of the fingerprint image is equal to or falls within the feature value of the fifth feature of the third target background image; wherein the fifth feature of the fingerprint image is one of a signal flight time of the ultrasonic signal for generation of the fingerprint image, a signal transmission frequency of the ultrasonic signal for generation of the fingerprint image, a collection time of the fingerprint image, a collection temperature of the fingerprint image, and a gray value matrix of the fingerprint image, the fifth feature of each second target background image is one of a signal flight time of an ultrasonic signal for generation of the second target background image, a signal transmission frequency of the ultrasonic signal for generation of the second target background image, a collection time of the second target background image, a collection temperature of the second target background image, and a gray value matrix of the second target background image, and the fifth feature is different from the first feature, the second feature, the third feature and the fourth feature; and in a case where there is only one third target background image, determining the third target background image as the target background image;

in a case where there are multiple third target background images, determining the target background image from the multiple third target background images by using a weight comparison method or a peak signal-to-noise ratio comparison method.

9. The method according to claim 8, wherein in a case where the third feature is the gray value matrix, the comparing the third feature of the fingerprint image with the third feature of each background image in the first target sub image library to determine a first target background image comprises:

calculating image similarity between the gray value matrix of the fingerprint image and the gray value matrix of each background image in the first target sub image library, and determining the first target background image according to the minimum value of the image similarity;

in a case where the fourth feature is the gray value matrix, the comparing the fourth feature of the fingerprint image with the fourth feature of each first target background image to determine a second target background image comprises:

calculating image similarity between the gray value matrix of the fingerprint image and the gray value matrix of the first target background image, and determining the second target background image according to the minimum value of the image similarity;

in a case where the fifth feature is the gray value matrix, the comparing the fifth feature of the fingerprint image with the fifth feature of each second target background image to determine a third target background image comprises:

calculating image similarity between the gray value matrix of the fingerprint image and the gray value matrix of the second target background image, and determining the third target background image according to the minimum value of the image similarity.

10. The method according to claim 1, wherein the background image library comprises a plurality of sub image libraries, and the plurality of sub image libraries are distinguished by a feature value of a first feature, and the first feature of the sub image libraries is a signal flight time of an ultrasonic signal for generation of each background image in the sub image libraries, a signal transmission frequency of the ultrasonic signal for generation of each background image in the sub image libraries, or a collection time of each background image in the sub image libraries; the generation of the background image library comprises:

collecting background images to be stored under different environmental conditions and thickness conditions, wherein the thickness condition comprises at least one of film thickness, screen thickness, and acoustic layer thickness, and the environmental condition comprises at least one of geographical location, ambient temperature, ambient brightness, ambient humidity, and ambient air pressure; and matching a second target sub image library for each background image to be stored from the background image library according to the first feature of each sub image library, and storing the background image to be stored in the second target sub image library.

11. The method according to claim 10, wherein the storing the background image to be stored in the second target sub image library comprises:

determining whether the image similarity between the background image to be stored and background images in the second target sub image library exceeds a preset similarity threshold; and if yes, deleting the background image with image similarity exceeding the preset similarity threshold, and adding a collection time to the background image to be stored, and storing the background image to be stored in the second target sub image library.

12. The method according to claim 11, wherein in a case where the image similarity between the background image to be stored and background images in the second target sub image library does not exceed the preset similarity threshold, the method further comprises:

determining whether the number of images in the second target sub image library is equal to the capacity of the sub image library; if yes, screening a background image to be deleted that meets a deletion condition in the second target sub image library; and deleting the background image to be deleted from the second target sub image library and adding the background image to be stored to the second target sub image library and adjusting the number of images in the second target sub image library.

13. The method according to claim 12, wherein in a case where the number of images in the second target sub image library is less than the capacity of the sub image library, the method further comprises adding the background image to be stored to the second target sub image library, and increasing the number of images in the second target sub image library progressively.

14. The method according to claim 1, wherein the generation of the background image library comprises:

collecting background images to be stored under different environmental conditions and thickness conditions, wherein the thickness condition comprises at least one of film thickness, screen thickness, and acoustic layer thickness, and the environmental condition comprises at least one of geographical location, ambient temperature, ambient brightness, ambient humidity, and ambient air pressure; and matching a second target sub image library for each background image to be stored from the background image library according to the first feature and the second feature of each sub image library, and storing the background image to be stored in the second target sub image library.

15. An electronic device, comprising:

a processor; and a memory storing a program, wherein the program comprises instructions, which, when executed by the processor, cause the processor to execute the method for generating a fingerprint image to be recognized according to claim 1.

16. An apparatus for generating a fingerprint image to be recognized, comprising:

a fingerprint recognizer, used to collect a fingerprint image of a fingerprint;

a processor, used to use a first feature of the fingerprint image to match a target background image for the fingerprint image from a background image library, wherein the first feature of the fingerprint image is at least one of a signal flight time of an ultrasonic signal for generation of the fingerprint image, a signal transmission frequency of the ultrasonic signal for generation of the fingerprint image, or a collection time of the fingerprint image; and the processor, used to subtract the target background image from the fingerprint image to obtain a fingerprint image to be recognized of the fingerprint;

wherein the background image library comprises a plurality of sub image libraries, and the plurality of sub image libraries are distinguished by feature values of the first feature and a second feature, and the first feature and the second feature of the sub image libraries are two of a signal flight time of an ultrasonic signal for generation of each background image in the sub image libraries, a signal transmission frequency of the ultrasonic signal for generation of each background image in the sub image libraries, a collection time of each background image in the sub image libraries, and a collection temperature of an environment in which an electronic device that generates each background image in the sub image libraries is located.

* * * * *